(12) United States Patent
Gisquet et al.

(10) Patent No.: US 10,972,742 B2
(45) Date of Patent: Apr. 6, 2021

(54) ENCODING PROCESS USING A PALETTE MODE

(71) Applicant: CANON KABUSHIKI KAISHA, Tokyo (JP)

(72) Inventors: Christophe Gisquet, Rennes (FR); Patrice Onno, Rennes (FR); Guillaume Laroche, Melesse (FR)

(73) Assignee: Canon Kabushiki Kaisha, Tokyo (JP)

( * ) Notice: Subject to any disclaimer, the term of this patent is extended or adjusted under 35 U.S.C. 154(b) by 197 days.

(21) Appl. No.: 15/105,521

(22) PCT Filed: Dec. 18, 2014

(86) PCT No.: PCT/EP2014/078606
§ 371 (c)(1),
(2) Date: Jun. 16, 2016

(87) PCT Pub. No.: WO2015/091879
PCT Pub. Date: Jun. 25, 2015

(65) Prior Publication Data
US 2016/0316214 A1    Oct. 27, 2016

(30) Foreign Application Priority Data

Dec. 19, 2013   (GB) ...................................... 1322616
May 21, 2014    (GB) ...................................... 1409081

(51) Int. Cl.
*H04N 19/186*   (2014.01)
*G09G 5/06*     (2006.01)
(Continued)

(52) U.S. Cl.
CPC ............. *H04N 19/186* (2014.11); *G09G 5/06* (2013.01); *H04N 1/644* (2013.01);
(Continued)

(58) Field of Classification Search
CPC ............... H04N 19/186; H04N 19/176; H04N 19/124; H04N 19/147; G09G 5/06; G09G 2320/106
(Continued)

(56) References Cited

U.S. PATENT DOCUMENTS 6,411,730 B1    6/2002  Bartell
6,819,793 B1 *  11/2004 Reshetov ................ G06T 9/005
                                                        382/166
(Continued)

FOREIGN PATENT DOCUMENTS

EP    0301207 A2    2/1989
EP    1573677 A1    9/2005
(Continued)

OTHER PUBLICATIONS

Anonymous: "The H.264 Advanced Video Compression Standard", H.264 Prediction 2nd Edition, chapter 6, Iain E. Richardson, Unknown, Apr. 20, 2010, XP030001637, section 6.4.4.
(Continued)

*Primary Examiner* — Hee-Yong Kim
*Assistant Examiner* — Christopher S Kelley
(74) *Attorney, Agent, or Firm* — Canon U.S.A., Inc. IP Division

(57) ABSTRACT

The present invention is related to video coding and decoding, in particular HEVC RExt that define a palette coding mode dedicated to the coding of screen contents. In improved palette coding modes according to the invention, when building a palette, each time a new pixel is added to the class a palette entry defines, the palette entry is modified to take the means value of the pixels belonging to such class. In other improved palette coding modes, a built palette is post-processed to substitute a palette entry with a close entry of a palette predictor PRED. In yet other embodiments,
(Continued)

palette coding modes having different threshold values to drive the building of their respective palettes are successively tested to use the best one in terms of rate-distortion criterion.

16 Claims, 17 Drawing Sheets

(51) Int. Cl.
　　*H04N 19/147*　　(2014.01)
　　*H04N 19/176*　　(2014.01)
　　*H04N 19/124*　　(2014.01)
　　*H04N 1/64*　　(2006.01)
　　*H04N 19/94*　　(2014.01)
　　*H04N 19/182*　　(2014.01)
　　*H04N 19/593*　　(2014.01)
　　*H04N 19/50*　　(2014.01)

(52) U.S. Cl.
　　CPC ......... *H04N 19/124* (2014.11); *H04N 19/147* (2014.11); *H04N 19/176* (2014.11); *H04N 19/182* (2014.11); *H04N 19/50* (2014.11); *H04N 19/593* (2014.11); *H04N 19/94* (2014.11); *G09G 2320/106* (2013.01); *G09G 2340/02* (2013.01)

(58) Field of Classification Search
　　USPC ...................................... 375/240.12
　　See application file for complete search history.

(56) References Cited

U.S. PATENT DOCUMENTS

| | | | | |
|---|---|---|---|---|
| 10,055,189 | B2 * | 8/2018 | Tsai | H04N 19/90 |
| 2015/0016501 | A1 * | 1/2015 | Guo | G06T 9/00 375/240.02 |
| 2015/0146976 | A1 * | 5/2015 | Ma | H04N 1/646 382/166 |
| 2015/0281703 | A1 * | 10/2015 | Zou | H04N 19/94 375/240.24 |

FOREIGN PATENT DOCUMENTS

| | | |
|---|---|---|
| GB | 2523076 A | 8/2015 |
| WO | 01/35656 A1 | 5/2001 |
| WO | 02/069270 A1 | 9/2002 |
| WO | 2014/165789 A1 | 10/2014 |
| WO | 2015/006724 A1 | 1/2015 |

OTHER PUBLICATIONS

Lan et al., "Compress compound images in H.264/MPEG-4 AVC by fully exploiting spatial correlation", Circuits and Systems, 2009. ISCAS 2009, IEEE International Symposium on, IEEE, Piscataway, NJ, USA, May 24, 2009, pp. 2818-2821, XP031479830, ISBN: 978-1-4244-3827-3, section III.B.

Fojtik et al., "Invisible modification of the palette color image enhancing lossless compression", Proceedings of SPIE, SPIE—International Society for Optical Engineering, US, vol. 3409, May 1, 1998, pp. 242-252, XP008024006, ISSN: 0277-786X, DOI: 10.1117/12.324115 ISBN: 978-1-62841-351-9, sections 1.1 and 1.2.

Guo et al., "Non-RCE3: Modified Palette Mode for Screen Content Coding", 14. JCT-VC Meeting, Jul. 25, 2013- Aug. 2, 2013, Vienna, (Joint Collaborative Team on Video Coding of ISO/IEC JTC1/SC29/WG11 and ITU-T SG.16 ), URL: http://wftp3.itu.int/av-arch/jctvc-site/, No. JCTVC-N0249, Jul. 16, 2013, XP030114767, the whole document.

Guo et al., "RCE3: Results of Test 3.1 on Palette Mode for Screen Content Coding", 14. JCT-VC Meeting, Jul. 25, 2013-Aug. 2, 2013, Vienna, (Joint Collaborative Team on Video Coding of ISO/IEC JTC1/SC29/ WG11 and ITU-T SG.16 ), URL: http://wftp3.itu.int/av-arch/jctvc-site/, No. JCTVC-N0247, Jul. 16, 2013, XP030114764, section 2.

Guo et al., "AHG8: Major-color-based screen content coding", 15. JCT-VC Meeting, Oct. 23, 2013-Nov. 1, 2013, Geneva, (Joint Collaborative Team on Video Coding of ISO/IEC JTC1/SC29/WG11 and ITU-T SG.16 ), URL: http://wftp3.itu.int/av-arch/jctvc-site/, No. JCTVC-O0182-v3, Oct. 25, 2013, XP030115219, the whole document.

Joshi et al., "Screen Content Coding Test Model 2(SCM 2)", 18. JCT-VC Meeting, Jun. 30, 2014-Jul. 9, 2014, Sapporo, (Joint Collaborative Team on Video Coding of ISO/IEC JTC1/SC29/WG11 and ITU-T SG.16 ), URL: http://wftp3.itu.int/av-arch/jctvc-site/, No. JCTVC-RI014, Oct. 17, 2014, XP030116701, section 3.4.

Lai et al., "Description of screen content coding technology proposal by MediaTek", 17. JCT-VC Meeting, Mar. 27, 2014-Apr. 4, 2014, Valencia, (Joint Collaborative Team on Video Coding of ISO/IEC JTC1/SC29/WG11 and ITU-T SG.16 ), URL: http://wftp3.itu.int/av-arch/jctvc-site/, No. JCTVC-Q0033-v4, Mar. 26, 2014, XP030115920, section 2.7.3.1.2.2.

Lan et al., "Intra and inter coding tools for screen contents", Mar. 11, 2011, No. JCTVC-EI45, Mar. 11, 2011, XP030008651, ISSN: 0000-0007, section 2.2.

Laroche et al., "Non-RCE4: Palette Prediction for Palette mode", 16. JCT-VC Meeting, Jan. 9, 2014-Jan. 17, 2014, San Jose, (Joint Collaborative Team on Video Coding of ISO/IEC JTC1/SC29/WG11 and ITU-T SG.16 ), URL: http://wftp3.itu.int/av-arch/jctvc-site/, No. JCTVC-P0114, Jan. 3, 2014, XP030115610, the whole document.

Laroche et al., "Non-RCE4: combination of palette coding improvements", 16. JCT-VC Meeting, Jan. 9, 2014-Jan. 17, 2014, San Jose, (Joint Collaborative Team on Video Coding of ISO/IEC JTC1/SC29/WG11 and ITU-T SG.16 ), URL: http://wftp3.itu.int/av-arch/jctvc-site/, No. JCTVC-P0119-v3, Jan. 10, 2014, XP030115619, section 3.

Mrak et al., "Transform skip mode", 7. JCT-VC Meeting, 98. MPEG Meeting, Nov. 21, 2011-Nov. 30, 2011, Geneva, (Joint Collaborative Team on Video Coding of ISO/IEC JTC1/SC29/WG11 and ITU-T SG.16 ), URL: http://wftp3.itu.int/av-arch/jctvc-site/, No. JCTVC-G575, Nov. 8, 2011, XP030110559, the whole document.

Bhatia et al., "Adaptive K-Means Clustering", American Association for Artificial Intelligence, Jan. 1, 2004, XP055198086, section Threshold-based clustering algorithm.

Mikolov et al., "Color Reduction Using K-Means Clustering", CESCG 2007, Apr. 23, 2007, XP055198004, section 2.

Sun et al., "AHG10: A triplet palette mode combining JCTVC-P0108 and JCTVC-P0198", 17. JCT-VC Meeting, Mar. 27, 2014-Apr. 4, 2014, Valencia, (Joint Collaborative Team on Video Coding of ISO/IEC TC1/SC29/ WG11 and ITU-T SG.16 ), URL: http://wftp3.itu.int/av-arch/jctvc-site/, No. JCTVC-Q0083-v3, Mar. 27, 2014, XP030115988, section 2.1.2.2.

Xiu et al., "Palette-based Coding in the Screen Content Coding Extension of the HEVC Standard", Apr. 7-9, 2015, 2015 Data Compression Conference (DCC), pp. 253-262, Section 3.

Zhu et al., "Template-based palette prediction", 14. JCT-VC Meeting, Jul. 25, 2013-Aug. 2, 2013,Vienna, (Joint Collaborative Team on Video Coding of JSO/IEC JTC1/SC29/WG11 and ITU-T SG.16 ), URL: http://wftp3.itu.int/av-arch/jctvc-site/, No. JCTVC-N0169, Jul. 15, 2013, XP030114647, the whole document.

Wei Pu, AHG10: Simplification of Palette Based Coding, Joint Collaborative Team on Video Coding (JCT-VC) of ITU-T SG16 WP3 and ISO/IEC JTC1/SC29/WG11, 17th Meeting, Mar. 27-Apr. 4, 2014, pp. 1-4, Doc. No. JCTVC-Q0047, Valencia, Spain.

\* cited by examiner

Block 91 (8×8 grid):
| 0 | 0 | 0 | 0 | 0 | 0 | 0 | 0 |
| 0 | 1 | 0 | 0 | 0 | 0 | 0 | 0 |
| 0 | 1 | 0 | 0 | 0 | 0 | 0 | 0 |
| 0 | 1 | 1 | 1 | 1 | 1 | 1 | 0 |
| 0 | 1 | 2 | 2 | 2 | 2 | 2 | 0 |
| 0 | 1 | 0 | 0 | 0 | 0 | 0 | 0 |
| 0 | 1 | 0 | 0 | 0 | 0 | 0 | 0 |
| 0 | 0 | 0 | 0 | 0 | 0 | 0 | 0 |

Block 92: Pred mode = 0 | Level = 0 | Run = 8 | Pred mode = 0 | Level = 1 | Run = 5 | Pred mode = 0 | Level = 1 | Run = 3 | Pred mode = 0 | Level = 2 | Run = 0

Block 93: Pred mode = 0 | Level = 1 | Run = 0 | Pred mode = 0 | Level = 0 | Run = 5 | Pred mode = 1 | Run = 31 | Pred mode = 0 | Level = 0 | Run = 4

Fig. 9

ENCODING PROCESS USING A PALETTE MODE

CROSS-REFERENCE TO RELATED APPLICATIONS

The application is the National Phase application of PCT Application No. PCT/EP2014/078606, filed on Dec. 18, 2014 and titled "Improved Encoding Process Using A Palette Mode". This application claims the benefit under 35 U.S.C. § 119(a)-(d) of United Kingdom Patent Application No. 1322616.2, filed on Dec. 19, 2013 and titled "Improved palette mode in HEVC for the encoding process", and United Kingdom Patent Application No. 1409081.5, filed on May 21, 2014 and titled "Improved Encoding Process Using A Palette Mode". The above cited patent applications are incorporated herein by reference in their entirety.

FIELD OF THE INVENTION

The present invention is related to video coding and decoding. More precisely, the present invention is dedicated to palette generation and to palette mode coding methods. The Palette mode is a coding method that has been presented in the scope of HEVC Range Extension. This coding method is quite efficient for video coding targeting "screen content" video sequence.

BACKGROUND OF THE INVENTION

The invention applies to a mode of coding where a current block of pixels is predictively encoded based on a predictor block encoded with or built from a so-called palette.

A palette in this document is defined as a look up table having entries associating an index with a value of a pixel. Typically, but not necessary, the value of a pixel is constituted by the value of each colour component associated with the pixel, resulting in a colour palette. On the other hand, the value of a pixel may be made of a single pixel component, resulting in a monochrome palette.

This mode of encoding a block of pixel is generally referred to as Palette coding mode. It is contemplated to adopt this mode, for example, in the Range Extension of the High Efficiency Video Coding (HEVC: ISO/IEC 23008-2 MPEG-H Part 2/ITU-T H.265) international standard.

When encoding an image in a video sequence, the image is first divided into coding entities of pixels of equal size referred to as Coding Tree Block (CTB). The size of a Coding Tree Block is typically 64 by 64 pixels. Each Coding Tree Block may then be broken down into a hierarchical tree of smaller blocks which size may vary and which are the actual blocks of pixels to encode. These smaller blocks to encode are referred to as Coding Unit (CU).

The encoding of a particular Coding Unit is typically predictive. This means that a predictor block is first determined. Next, the difference between the predictor block and the Coding Unit is calculated. This difference is called the residue. Next, this residue is compressed. The actual encoded information of the Coding Unit is made of some information to indicate the way of determining the predictor block and the compressed residue. Best predictor blocks are blocks as similar as possible to the Coding Unit in order to get a small residue that could be efficiently compressed.

The coding mode is defined based on the method used to determine the predictor block for the predictive encoding method of a Coding Unit.

A first coding mode is referred to as INTRA mode. According to INTRA mode, the predictor block is built based on the value of pixels immediately surrounding the Coding Unit within the current image. It is worth noting that the predictor block is not a block of the current image but a construction. A direction is used to determine which pixels of the border are actually used to build the predictor block and how they are used. The idea behind INTRA mode is that, due to the general coherence of natural images, the pixels immediately surrounding the Coding Unit are likely to be similar to pixels of the current Coding Unit. Therefore, it is possible to get a good prediction of the value of pixels of the Coding Unit using a predictor block based on these surrounding pixels.

A second coding mode is referred to as INTER mode. According to INTER mode, the predictor block is a block of another image. The idea behind the INTER mode is that successive images in a sequence are generally very similar. The main difference comes typically from a motion between these images due to the scrolling of the camera or due to moving objects in the scene. The predictor block is determined by a vector giving its location in a reference image relatively to the location of the Coding Unit within the current image. This vector is referred to as a motion vector. According to this mode, the encoding of such Coding Unit using this mode comprises motion information comprising the motion vector and the compressed residue.

We focus in this document on a third coding mode called Palette mode. According to the Palette mode, it is possible to define a predictor block for a given Coding Unit as a block of indexes from a palette: for each pixel location in the predictor block, the predictor block contains the index associated with the pixel value in the Palette which is the closest to the value of the pixel having the same location (i.e. colocated) in the coding unit. A residue representing the difference between the predictor block and the coding unit is then calculated and encoded. Entry indexes in the Palette are also known as "levels".

Present embodiments of the invention improve the coding efficiency of the Palette mode.

SUMMARY OF THE INVENTION

According to a first aspect of the present invention there is provided a method for processing a current block of pixels of an image using a palette coding mode, the current palette comprising a set of entries associating respective entry indexes with corresponding pixel values, the method comprising the steps of:
generating an input palette from the pixels of the block;
post-processing the input palette to output the current palette;
wherein the post-processing step includes substituting an entry of the input palette with an entry of a palette predictor if a predetermined criterion on the entry is met.

In an embodiment, the predetermined criterion is that the entry of the input palette and the entry of the palette predictor are close one to each other compared to a predefined threshold. In an embodiment, the predefined threshold equals 1 when considering a distance, for instance a L1 or L2 distance, between the entry of the input palette and the entry of the palette predictor.

In another embodiment, the predefined threshold depends on a quantization parameter used in a quantization of the encoding.

In some embodiments the predetermined criterion is a rate-distortion criterion.

In a second aspect of the present invention there is provided a method for processing a current block of pixels of an image using a palette coding mode, the current palette comprising a set of entries associating respective entry indexes with corresponding pixel values, the method comprising the steps of:

generating an input palette from the pixels of the block;

post-processing the input palette to output the current palette;

wherein the post-processing step includes removing an entry of the input palette based on a frequency of use of the entry by the pixels of the blocks or based on a rate-distortion criterion.

According to a third aspect of the present invention there is provided a method for processing a current block of pixels of an image using a palette coding mode, the current palette comprising a set of entries associating respective entry indexes with corresponding pixel values, the method comprising the steps of:

generating an input palette from the pixels of the block;

post-processing the input palette to output the current palette;

wherein the post-processing step includes deleting duplicated entries of the palette being built before outputting it as the current palette.

According to a fourth aspect there is provided a device for processing a current block of pixels of an image using a palette coding mode—the current palette comprising a set of entries associating respective entry indexes with corresponding pixel values, the device comprising at least one microprocessor configured for carrying out the steps of:

generating an input palette from the pixels of the block;

post-processing the input palette to output the current palette;

wherein the post-processing step includes substituting an entry of the input palette with an entry of a palette predictor if a predetermined criterion on the entry is met.

In an embodiment, the predetermined criterion is that the entry of the input palette and the entry of the palette predictor are close one to each other compared to a predefined threshold. In an embodiment, the predefined threshold equals 1 when considering a distance, for instance a L1 or L2 distance, between the entry of the input palette and the entry of the palette predictor.

In some embodiments, the predefined threshold depends on a quantization parameter used in a quantization of the encoding.

In an embodiment, the predetermined criterion is a rate-distortion criterion.

According to a fifth aspect of the present invention, there is provided a device for processing a current block of pixels of an image using a palette coding mode, the current palette comprising a set of entries associating respective entry indexes with corresponding pixel values, the device comprising at least one microprocessor configured for carrying out the steps of:

generating an input palette from the pixels of the block;

post-processing the input palette to output the current palette;

wherein the post-processing step includes removing an entry of the input palette based on a frequency of use of the entry by the pixels of the blocks or based on a rate-distortion criterion.

According to a sixth aspect of the present invention, there is provided a device for processing a current block of pixels of an image using a palette coding mode, the current palette comprising a set of entries associating respective entry indexes with corresponding pixel values, the device comprising at least one microprocessor configured for carrying out the steps of:

generating an input palette from the pixels of the block;

post-processing the input palette to output the current palette;

wherein the post-processing step includes deleting duplicated entries of the palette being built before outputting it as the current palette.

According to a seventh aspect of the present invention there is provided a method for coding a block of a picture in a video sequence, said method comprising for at least one portion of the block, encoding a colour based on a colour palette with several colour elements, said method comprising for a current portion, inserting said portion's current colour in the colour palette as a new colour element, if the current colour is not present in the colour palette and if the absolute difference between the current colour and at least one element of the colour is superior to a threshold.

The threshold may be an adaptive threshold. In other words, the threshold may be adapted according to a parameter i.e. have a value which depends on or is based on one or more parameters or values. In an embodiment, the threshold is adapted according to a predetermined quality parameter. In an embodiment, the coding of the block comprises using a given coding mode having a quantization step based on quantization parameters, the threshold being adapted according to the value taken by the quantization parameters. Alternatively, the threshold may be predetermined and have a predefined value.

In an embodiment, the quantization step is applied on a residual obtained from the picture's block and wherein said quantization step is realized in portion's domain. In an embodiment, the given mode is the Transform Skip mode.

According to an eighth aspect of the present invention there is provided a method for coding a block of a picture in a video sequence, said method comprising for at least one portion of the block, encoding a colour based on a colour palette with several colour elements, each colour element being defined according to a weighted combination of several colour elements, said encoding the colour of a current portion comprising: allocating to the at least one portion of the block, a colour element selected among the colour elements of the colour palette, the definition of said selected colour element being the closest to the definition of said portion colour's definition, and updating the definition of at least one colour element of the colour palette with a value based on the real colours of all the portions of the block whose said colour element has been allocated. In an embodiment, the definition of at least one colour element of the colour palette is updated with a value corresponding to the average of the real colours of all the portions of the block whose said colour element has been allocated. In an embodiment, the definition of at least one colour element of the colour palette is updated with a value corresponding to the median of the real colours of all the portions of the block whose said colour element has been allocated.

According to a ninth aspect of the present invention, there is provided a method for coding a block of a picture in a video sequence, said method comprising for at least one portion of the block, encoding a colour based on a colour palette with several colour elements, each colour element being defined according to a weighted combination of several colour elements, wherein encoding the colour of a current portion comprising: considering all the colour elements of the colour palette, and encoding the colour of the current portion by using the colour element whose definition is the closest to the current portion colour's definition.

In embodiments of the above described seventh, eighth and ninth aspects the portion of the block is a pixel of the block.

According to a tenth aspect of the present invention there is provided a coding device configured to implement a coding method according to any of the seventh, eighth or ninth aspects described above. The coding device may be a device for encoding a sequence of digital images into a bitstream.

According to an eleventh aspect there is provided a computer program comprising instructions which upon execution cause a computer to perform the method of any of the preceding method aspects described above.

According to a twelfth aspect there is provided a non-transitory computer readable medium storing a program which when executed by one or more processors of a device causes the device to perform the method of any of the preceding method aspects described above.

According to a thirteenth aspect of the invention there is provided a device for processing a current block of pixels of an image using a palette coding mode, the current palette comprising a set of entries associating respective entry indexes with corresponding pixel values, the device comprising at least one microprocessor configured to, for at least one portion of the block, encode a colour based on a colour palette with several colour elements, said method comprising for a current portion, inserting said portion's current colour in the colour palette as a new colour element, if the current colour is not present in the colour palette and if the absolute difference between the current colour and at least one element of the colour is superior to a threshold.

According to a fourteenth aspect of the invention there is provided a device for processing a current block of pixels of an image using a palette coding mode, the current palette comprising a set of entries associating respective entry indexes with corresponding pixel values, the device comprising at least one microprocessor configured to, for at least one portion of the block, encode a colour based on a colour palette with several colour elements, each colour element being defined according to a weighted combination of several colour elements, said encoding the colour of a current portion comprising: allocating to the at least one portion of the block, a colour element selected among the colour elements of the colour palette, the definition of said selected colour element being the closest to the definition of said portion colour's definition, and updating the definition of at least one colour element of the colour palette with a value based on the real colours of all the portions of the block whose said colour element has been allocated.

According to a fifteenth aspect of the invention there is provided a device for processing a current block of pixels of an image using a palette coding mode, the current palette comprising a set of entries associating respective entry indexes with corresponding pixel values, the device comprising at least one microprocessor configured to for at least one portion of the block, encoding a colour based on a colour palette with several colour elements, each colour element being defined according to a weighted combination of several colour elements, wherein encoding the colour of a current portion comprising: considering all the colour elements of the colour palette, and encoding the colour of the current portion by using the colour element whose definition is the closest to the current portion colour's definition.

In another aspect of the invention embodiments are directed to a method for determining a palette used to encode a block of pixels using a palette coding mode, comprising the steps of:

iteratively considering each pixel of the block to add, to the palette, a new element having the value of the considered pixel each time the considered pixel is too far from all the element or elements already in the palette under construction, and otherwise to increment a counter associated with a palette element that is close enough to the considered pixel;

wherein its associated palette element is modified into a modified palette element that depends on all the pixels for which the counter has already been incremented.

Correspondingly, a device for determining a palette used to encode a block of pixels using a palette coding mode, according to these embodiments, comprises at least one microprocessor configured for carrying out the steps of:

iteratively considering each pixel of the block to add, to the palette, a new element having the value of the considered pixel each time the considered pixel is too far from all the element or elements already in the palette under construction, and otherwise to increment a counter associated with a palette element that is close enough to the considered pixel;

wherein its associated palette element is modified into a modified palette element that depends on all the pixels for which the counter has already been incremented.

The palette elements are thus more representative of the pixels belonging to their respective classes, therefore improving the coding efficiency based on a palette coding mode.

Optional features of these embodiments are defined in appended claims. Some of these features are explained here below with reference to a method, while they can be transposed into system features dedicated to a device according to embodiments of the invention.

In some embodiments, modifying the palette element comprises summing the value of the considered element with the values of all the pixels for which the associated counter has already been incremented, and dividing the sum by the value of the associated counter to obtain the value of the modified palette element.

In other embodiments, the value of the modified palette element is the median value of the pixels for which the associated counter has been incremented.

In yet other embodiments, the value of the modified palette element is the most frequent value of the pixels from amongst the values of the pixels for which the associated counter has been incremented.

In yet other embodiments, the palette element is modified only when the associated counter meets a criterion, for instance when the associated counter is a power of two.

According to a specific feature, the method may also comprise, after all the pixels of the block have been iteratively considered, a step of modifying the palette elements of the palette based on all the pixels for which the associated counters has been incremented, respectively.

In yet other embodiments, a distance between the considered pixel and any palette element is a distance, for instance a L1 distance or a L2 distance, between their values, and the distance is compared to a distance threshold to determine closeness between the considered pixel and a palette element.

According to specific features, the distance threshold depends on a quantization parameter used in a quantization of the encoding.

According to other specific features, the palette element associated with the incremented counter is the closest palette element to the considered pixel from amongst all the elements already in the palette.

According to yet other specific features, the palette element associated with the incremented counter is the first element considered in the palette that is close to the considered pixel given the distance threshold.

In specific embodiments, the very first element considered in the palette to determine a distance with the considered pixel is the palette element, the associated counter of which has been incremented for the pixel previously considered.

In yet other embodiments, the value of each pixel and palette element includes two or more colour components, and the step of modifying the associated palette element includes modifying each colour component of the associated palette element based on the same colour components of all the pixels for which the counter has already been incremented.

All these embodiments improve the efficiency of the palette since each resulting palette element proves to be a better predictor of the block pixels, on average.

In a further aspect, embodiments of the invention are directed to a method for processing a current block of pixels of an image using a palette coding mode, the palette coding mode using a current palette to build a predictor block of indexes to predict the current block of pixels, the current palette comprising a set of entries associating respective entry indexes with corresponding pixel values, the method comprising the steps of:

generating an input palette from the pixels of the block;
post-processing the input palette to output the current palette used to build a predictor block;
wherein the post-processing step includes setting the pixel value of an entry of the input palette to a predetermined value if a predetermined criterion on the entry is met.

Correspondingly, a device for processing a current block of pixels of an image using a palette coding mode, the palette coding mode using a current palette to build a predictor block of indexes to predict the current block of pixels, the current palette comprising a set of entries associating respective entry indexes with corresponding pixel values, comprises at least one microprocessor configured for carrying out the step of:

generating an input palette from the pixels of the block;
post-processing the input palette to output the current palette used to build a predictor block;
wherein the post-processing step includes setting the pixel value of an entry of the input palette to a predetermined value if a predetermined criterion on the entry is met.

The elements of the output palette may thus be more relevant for coding efficiency than the palette element conventionally built. As described below, palette elements of a palette predictor may be used to replace an element of the input palette, thereby improving the prediction-based coding of the palette.

Optional features of these embodiments are defined in appended claims. Some of these features are explained here below with reference to a method, while they can be transposed into system features dedicated to a device according to embodiments of the invention.

In embodiments, the method further comprises predicting the current palette using a palette predictor; wherein the entry of the input palette is substituted with an entry of the palette predictor during the post-processing step.

In specific embodiments, the predetermined criterion is that the entry of the input palette and the entry of the palette predictor are close one to each other compared to a predefined threshold.

According to specific features, the predefined threshold equals 1 when considering a distance, for instance a L1 or L2 distance, between the entry of the input palette and the entry of the palette predictor.

According to another specific feature, the predefined threshold depends on a quantization parameter used in a quantization of the encoding.

In some embodiments, the predetermined criterion is a rate-distortion criterion.

In yet other embodiments, the method further comprises removing an entry of the input palette based on a frequency of use of the entry by the pixels of the blocks or based on a rate-distortion criterion.

In yet other embodiments, the method further comprises deleting duplicated entries of the palette being built before outputting it as the current palette.

All these embodiments improve the efficiency of the output palette compared to the input palette, for both reasons that the size (and thus the encoding cost) of the palette is reduced and that each resulting palette element proves to be a better predictor of the block pixels, on average.

Yet other embodiments of the invention are directed to a method for encoding a current block of pixels of an image, comprising a mutlipass operation to select a coding mode from a plurality of coding modes based on a rate-distortion criterion, the coding modes including a palette coding mode, the palette coding mode using a palette to build a predictor block of indexes to predict the current block of pixels, the palette being iteratively built from the pixel values of the current block based on a threshold of distance between a pixel value and values of the entries already in the palette being built, wherein the multipass operation includes iteratively determining a rate-distortion criterion for a plurality of palette coding modes, the distance threshold being modified from one iteration to the other, and selecting the palette coding mode having the distance threshold that provides the best rate-distortion criterion.

Correspondingly, a device for encoding a current block of pixels of an image, according to these embodiments, comprises at least one microprocessor configured for carrying out the step of:

performing a mutlipass operation to select a coding mode from a plurality of coding modes based on a rate-distortion criterion, the coding modes including a palette coding mode, the palette coding mode using a palette to build a predictor block of indexes to predict the current block of pixels, the palette being iteratively built from the pixel values of the current block based on a threshold of distance between a pixel value and values of the entries already in the palette being built, wherein the multipass operation includes iteratively determining a rate-distortion criterion for a plurality of palette coding modes, the distance threshold being modified from one iteration to the other, and selecting the palette coding mode having the distance threshold that provides the best rate-distortion criterion.

A better palette encoding is thus applied to the pixel blocks.

Optional features of these embodiments are defined in appended claims. Some of these features are explained here below with reference to a method, while they can be transposed into system features dedicated to a device according to embodiments of the invention.

In embodiments, the distance threshold depends on a quantization parameter used in a quantization of the encoding.

In other embodiments, the multipass operation further includes determining the best coding mode from amongst a plurality of coding modes except palette coding modes, based on a rate-distortion criterion, and the iterations for a plurality of palette coding modes are performed only if a first palette coding mode is a better coding mode than the determined best coding mode, based on the same rate-distortion criterion.

Another aspect of the invention relates to a non-transitory computer-readable medium storing a program which, when executed by a microprocessor or computer system in a device, causes the device to perform any method as defined above.

The non-transitory computer-readable medium may have features and advantages that are analogous to those set out above and below in relation to the method and device, in particular that of improving coding efficiency of the Palette prediction mode.

Yet another aspect of the invention relates to a device comprising means adapted for carrying out each step of any method as defined above.

Yet other aspects of the invention relate to a method for determining a palette used to encode a block of pixels using a palette coding mode, substantially as herein described with reference to, and as shown in, FIG. 15 of the accompanying drawings; to a method for processing a current block of pixels of an image using a palette coding mode, the palette coding mode using a current palette to build a predictor block of indexes to predict the current block of pixels, the current palette comprising a set of entries associating respective entry indexes with corresponding pixel values, substantially as herein described with reference to, and as shown in, FIG. 16; FIGS. 12 and 16; or FIGS. 15 and 16 of the accompanying drawings; and to a method for encoding a current block of pixels of an image, substantially as herein described with reference to, and as shown in, FIG. 18 of the accompanying drawings.

According to a further aspect, the invention provides a method for coding a block of a picture in a video sequence, said method comprising for at least one portion of the block, encoding a colour based on a colour palette with several colour elements, said method comprising for a current portion, inserting said portion's current colour in the colour palette as a new colour element, if the current colour is not present in the colour palette and if the absolute difference between the current colour and at least one element of the colour is superior to a predetermined threshold. Said threshold is adaptive.

In an embodiment, the threshold is adapted according to a predetermined quality parameter.

In an embodiment, the coding of the block comprises using a given coding mode having a quantization step based on quantization parameters, the threshold being adapted according to the value taken by the quantization parameters.

In an embodiment, the quantization step is applied on a residual obtained from the picture's block and wherein said quantization step is realized in portion's domain.

In an embodiment, the given mode is the Transform Skip mode.

In an embodiment, the threshold is adapted according to a rate-distortion criteria applied on the picture's block.

In an embodiment, a rate-distortion function J is defined by $J=D+\lambda.R$, where D is a measure of the distortion applied on the picture's block, R a coding cost of the bits and $\lambda$ a Lagrangian parameter, wherein the threshold is adapted according to the value taken by $\lambda$.

According to another aspect of the invention, there is provided a method for coding a block of a picture in a video sequence, said method comprising for at least one portion of the block, encoding a colour based on a colour palette with several colour elements, each colour element being defined according to a weighted combination of several colour components, said encoding the colour of a current portion comprising:
allocating to the at least one portion of the block, a colour element selected among the colour elements of the colour palette, the definition of said selected colour element being the closest to the definition of said portion colour's definition, and
updating the definition of at least one colour element of the colour palette with a value based on the real colours of all the portions of the block whose said colour element has been allocated.

In an embodiment, the definition of at least one colour element of the colour palette is updated with a value corresponding to the average of the real colours of all the portions of the block whose said colour element has been allocated.

In an embodiment, the definition of at least one colour element of the colour palette is updated with a value corresponding to the median of the real colours of all the portions of the block whose said colour element has been allocated.

According to another aspect of the invention, it is provided a method for coding a block of a picture in a video sequence, said method comprising for at least one portion of the block, encoding a colour based on a colour palette with several colour elements, each colour element being defined according to a weighted combination of several colour components, wherein encoding the colour of a current portion comprising:
Considering all the colour elements of the colour palette, and
Encoding the colour of the current portion by using the colour element whose definition is the closest to the current portion colour's definition.

According to another aspect of the invention, it is provided a method for coding a block of a picture in a video sequence, said method comprising for at least one portion of the block, encoding a colour based on a colour palette with several colour elements, each colour element being defined according to a weighted combination of several colour components, wherein encoding the colour of a current portion comprising determining a prediction mode among at least two prediction modes, the determining step comprising:
Determining for each mode the value of a syntax element indicating the number of consecutive portions following the current portion having the same colour, and
If the value of the syntax element for the first mode is non-null and superior to the value of the syntax element for the second mode then selecting the first mode, else selecting the second mode.

According to another aspect of the invention, it is provided a method for coding a block of a picture in a video sequence, said method comprising for at least one portion of the block, encoding a colour based on a colour palette with several colour elements, each colour element being defined according to a weighted combination of several colour components, wherein encoding the colour of a current portion comprising determining a prediction mode among at least two prediction modes, the first mode being associated to a syntax value indicating the number of consecutive portions following the current portion having the same colour, and the second mode being associated to a syntax value indicating the number of consecutive portions following the current portion having the same colour and a value corresponding a colour element of the palette colour, the determining step comprising:

selecting for each mode the value of a syntax element only, and

If the value of the syntax element for the first mode is non-null and superior to the value of the syntax element for the second mode then selecting the first mode, else selecting the second mode.

In an embodiment, the first mode is the "copy up mode" where the colours of the current portion is copied from the colour of the portion located immediately above the current portion and the second mode is the "left prediction" mode where the colour of the current portion is predicted from the colour of the portion located at the left of the current portion. For example, the portion of the block may be a pixel of the block.

According to another aspect of the invention, it is provided a coding device configured to implement a coding method as mentioned above.

At least parts of the methods according to the invention may be computer implemented. Accordingly, the present invention may take the form of an entirely hardware embodiment, an entirely software embodiment (including firmware, resident software, micro-code, etc.) or an embodiment combining software and hardware aspects that may all generally be referred to herein as a "circuit", "module" or "system". Furthermore, the present invention may take the form of a computer program product embodied in any tangible medium of expression having computer usable program code embodied in the medium.

Since the present invention can be implemented in software, the present invention can be embodied as computer readable code for provision to a programmable apparatus on any suitable carrier medium. A tangible carrier medium may comprise a storage medium such as a floppy disk, a CD-ROM, a hard disk drive, a magnetic tape device or a solid state memory device and the like. A transient carrier medium may include a signal such as an electrical signal, an electronic signal, an optical signal, an acoustic signal, a magnetic signal or an electromagnetic signal, e.g. a microwave or RF signal.

BRIEF DESCRIPTION OF THE DRAWINGS

Embodiments of the invention will now be described, by way of example only, and with reference to the following drawings in which:

FIG. 9 illustrates the same block of levels and the set of syntax elements used for the encoding of this block of levels;

DETAILED DESCRIPTION OF EMBODIMENTS OF THE INVENTION

Figure 1:
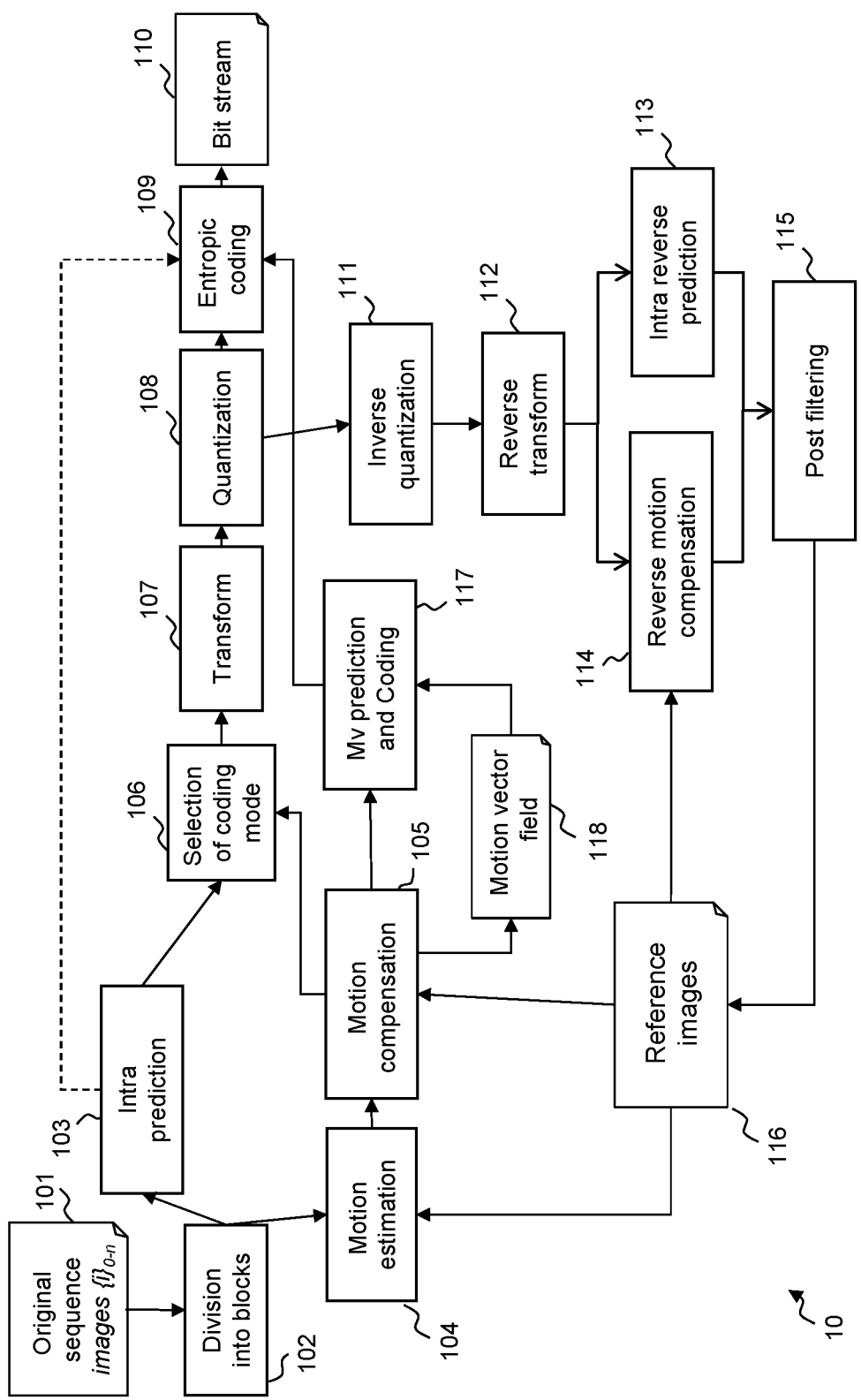
FIG. 1 illustrates the HEVC encoder architecture.

FIG. 1 illustrates the HEVC encoder architecture. In the video encoder, an original sequence 101 is divided into blocks of pixels 102. A coding mode is then affected to each block. There are two families of coding modes typically used in HEVC: the modes based on spatial prediction (INTRA modes) 103 and the modes based on temporal prediction (INTER, Bidir, Skip modes) based on motion estimation 104 and motion compensation 105. An extension of HEVC being currently designed, known as HEVC RExt, adds an additional coding mode, namely the Palette coding mode, that compete with INTRA and INTER coding modes to encode blocks of pixels. This Palette coding mode is described with more details below, in particular with reference to FIGS. 7 to 13.

An INTRA Coding Unit is generally predicted from the encoded pixels at its causal boundary by a process called INTRA prediction.

Temporal prediction of INTER coding mode first consists in finding in a previous or future frame called the reference frame 116 the reference area which is the closest to the Coding Unit in a motion estimation step 104. This reference area constitutes the predictor block. Next this Coding Unit is predicted using the predictor block to compute the residue in a motion compensation step 105.

In both cases, spatial and temporal prediction, a residual is computed by subtracting the Coding Unit from the original predictor block.

In the INTRA prediction, a prediction direction is encoded. In the temporal prediction, at least one motion vector is encoded. However, in order to further reduce the bitrate cost related to motion vector encoding, a motion vector is not directly encoded. Indeed, assuming that motion is homogeneous, it is particularly interesting to encode a motion vector as a difference between this motion vector, and a motion vector in its surrounding. In H.264/AVC coding standard for instance, motion vectors are encoded with respect to a median vector computed between 3 blocks located above and on the left of the current block. Only a difference, also called residual motion vector, computed between the median vector and the current block motion vector is encoded in the bitstream. This is processed in module "My prediction and coding" 117. The value of each encoded vector is stored in the motion vector field 118. The neighboring motion vectors, used for the prediction, are extracted from the motion vector field 118.

Then, the mode optimizing the rate distortion performance is selected in module 106, for example using a Lambda-based criterion such as D+λ.R, where D is the distortion, λ a Lambda or Lagrangian coefficient and R the rate). In order to further reduce the redundancies, a transform, typically a DCT, is applied to the residual block in module 107, and a quantization is applied to the coefficients in module 108. The quantized block of coefficients is then entropy coded in module 109 and the result is inserted in the bitstream 110.

The encoder then performs a decoding of the encoded frame for the future motion estimation in modules 111 to 116. This is a decoding loop at the encoder. These steps allow the encoder and the decoder to have the same reference frames. To reconstruct the coded frame, the residual is inverse quantized in module 111 and inverse transformed in module 112 in order to provide the "reconstructed" residual in the pixel domain. According to the encoding mode (INTER or INTRA), this residual is added to the INTER predictor 114 or to the INTRA predictor 113.

Then, this first reconstruction is filtered in module 115 by one or several kinds of post filtering. These post filters are integrated in the decoding loop. It means that they need to be applied on the reconstructed frame at the encoder and decoder in order to use the same reference frames at the encoder and decoder. The aim of this post filtering is to remove compression artifacts.

For example, H.264/AVC uses a deblocking filter. This filter can remove blocking artifacts due to the DCT quantization of residual and to block motion compensation. In the current HEVC standard, three types of loop filters are used: deblocking filter, sample adaptive offset (SAO) and adaptive loop filter (ALF).

Figure 2:
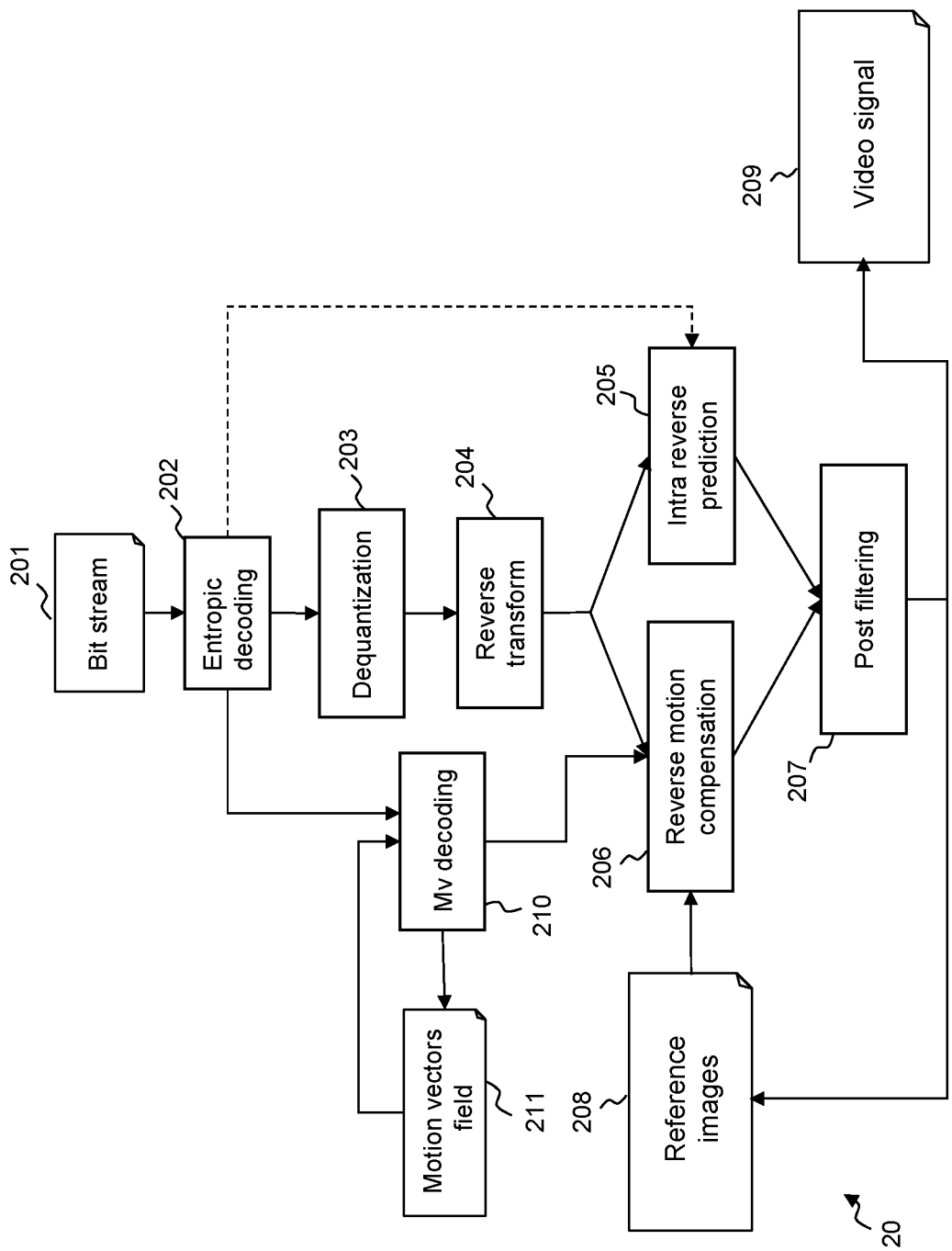
FIG. 2 illustrates the HEVC decoder architecture.

The principle of an HEVC decoder has been represented in FIG. 2. The video stream 201 is first entropy decoded in a module 202. The residual data are then inverse quantized in a module 203 and inverse transformed in a module 204 to obtain pixel values. The mode data are also entropy decoded and in function of the mode, an INTRA type decoding or an INTER type decoding is performed. In the case of INTRA mode, the INTRA prediction direction is decoded from the bitstream. The prediction direction is then used to locate the reference area 205. If the mode is INTER, the motion information is decoded from the bitstream 202. This is composed of the reference frame index and the motion vector residual. The motion vector predictor is added to the motion vector residual to obtain the motion vector 210. The motion vector is then used to locate the reference area in the reference frame 206. Note that the motion vector field data 211 is updated with the decoded motion vector in order to be used for the prediction of the next decoded motion vectors. This first reconstruction of the decoded frame is then post filtered 207 with exactly the same post filter as used at encoder side. The output of the decoder is the de-compressed video 209.

Figure 3:
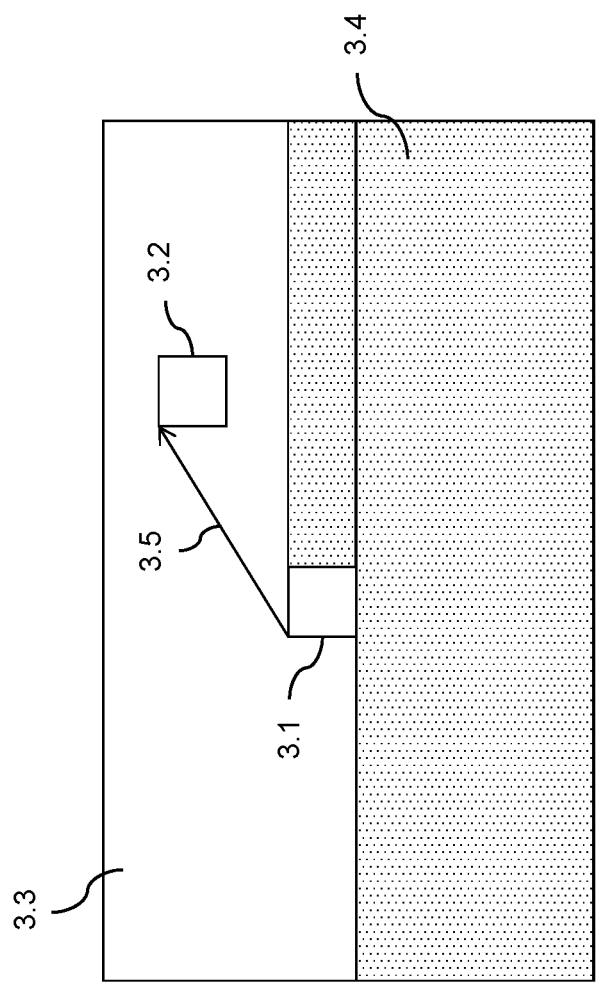
FIG. 3 illustrates the concept of the causal area.

FIG. 3 illustrates the causal principle resulting from block-by-block encoding as in HEVC.

At a high-level, an image is divided into Coding Units that are encoded in raster scan order. Thus, when coding block 3.1, all the blocks of area 3.3 have already been encoded, and can be considered available to the encoder. Similarly, when decoding block 3.1 at the decoder, all the blocks of area 3.3 have already been decoded and thus reconstructed, and can be considered as available at the decoder. Area 3.3 is called the causal area of the Coding Unit 3.1. Once Coding Unit 3.1 is encoded, it will belong to the causal area for the next Coding Unit. This next Coding Unit, as well as all the next ones, belongs to area 3.4 illustrated as doted area, and cannot be used for coding the current Coding Unit 3.1. It is worth noting that the causal area is constituted by reconstructed blocks. The information used to encode a given Coding Unit is not the original blocks of the image for the reason that this information is not available at decoding. The only information available at decoding is the reconstructed version of the blocks of pixels in the causal area, namely the decoded version of these blocks. For this reason, at encoding, previously encoded blocks of the causal area are decoded to provide this reconstructed version of these blocks.

It is possible to use information from a block 3.2 in the causal area when encoding a block 3.1. In the HEVC Range Extension draft specifications, a displacement vector 3.5, which can be transmitted in the bitstream, may indicate this block 3.2.

Figure 5:
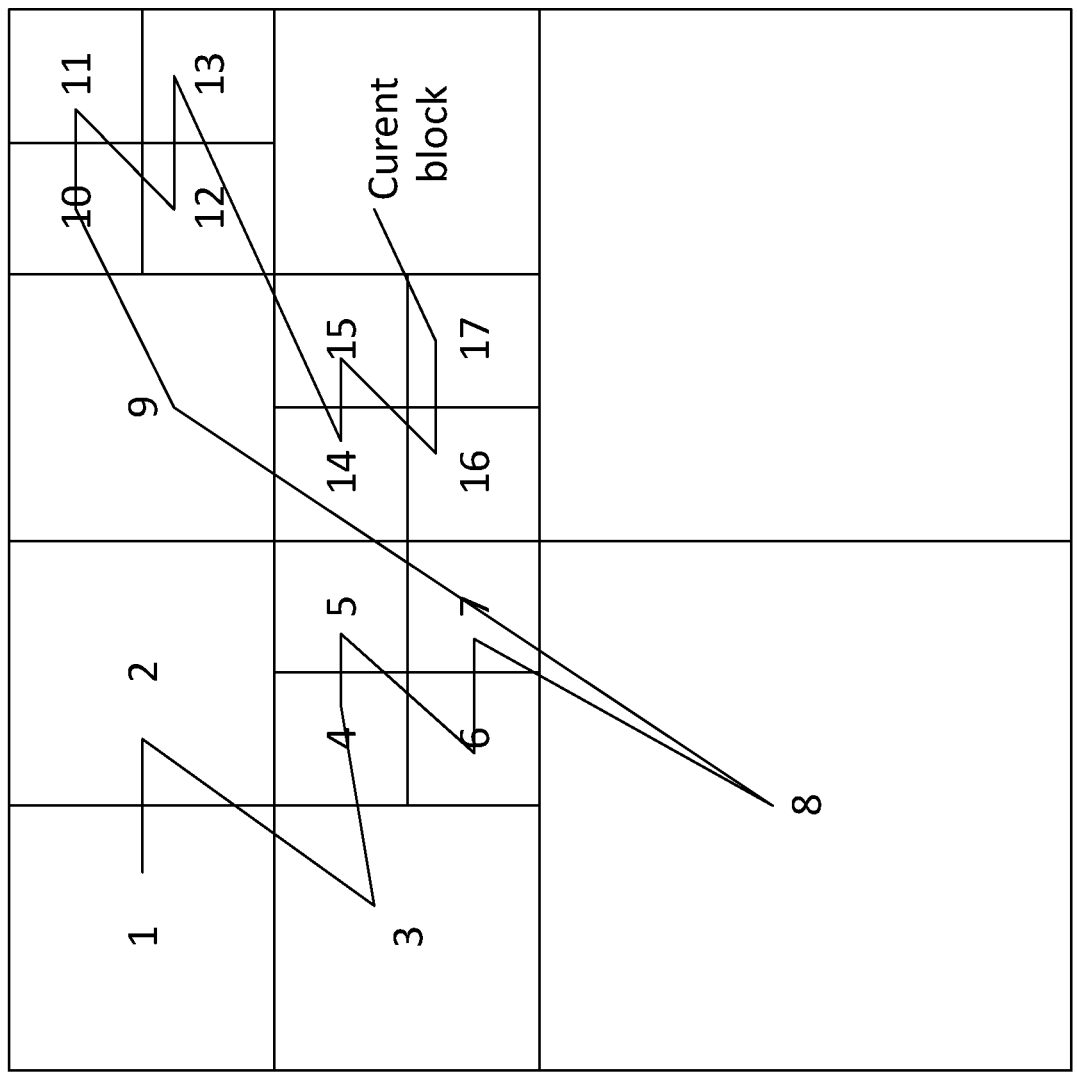
FIG. 5 illustrates the Coding Tree Block splitting in Coding Units and the scan order decoding of these Coding Unit.

FIG. 5 illustrates a splitting of a Coding Tree Block into Coding Units and an exemplary scan order to sequentially process of these Coding Units. In the HEVC standard, the block structure is organized by Coding Tree Blocks (CTBs). A frame contains several non-overlapped and square Coding Tree Block. The size of a Coding Tree Block can be equal to 64×64 to 16×16. This size is determined at sequence level. The most efficient size, in term of coding efficiency, is the largest one: 64×64. Please note that all Coding Tree Blocks have the same size except for the image border, meaning that they are arranged in rows. The size of the boundary CTBs is adapted according to the amount of remaining pixels.

Each Coding Tree Block contains one or more square Coding Units (CU). The Coding Tree Block is split based on a quad-tree structure into several Coding Units. The processing (coding or decoding) order of each Coding Unit in the Coding Tree Block follows the quad-tree structure based on a raster scan order. FIG. 5 shows an example of the processing order of Coding Units. In this figure, the number in each Coding Unit gives the processing order of each corresponding Coding Unit of this Coding Tree Block.

In HEVC, several methods are used to code the different syntax element, for example block residuals, information on predictor blocks (motion vectors, INTRA prediction directions, etc.). HEVC uses several types of entropy coding like the Context based Adaptive Binary Arithmetic Coding (CABAC), Golomb-rice Code, or simple binary representation called Fixed Length Coding. Most of the time a binary encoding process is performed to represent the different syntax element. This binary encoding process is also very specific and depends on the different syntax element.

For example, the syntax element called "coeff_abs_level_remaining" contains the absolute value or a part of an absolute of the coefficient residual. The idea of this binary encoding process is to use Golomb-Rice code for the first values and Exponential Golomb for the higher values. More specifically, depending on a given parameter called Golomb Order, this means that for representing the first values, for example values from 0 to 3, a Golomb-Rice code is used, then for higher values, for example values from 4 and above, an Exponential Golomb code is used. The Golomb Order is a parameter used by both the Golomb-Rice code and the exponential Golomb code.

Figure 6:
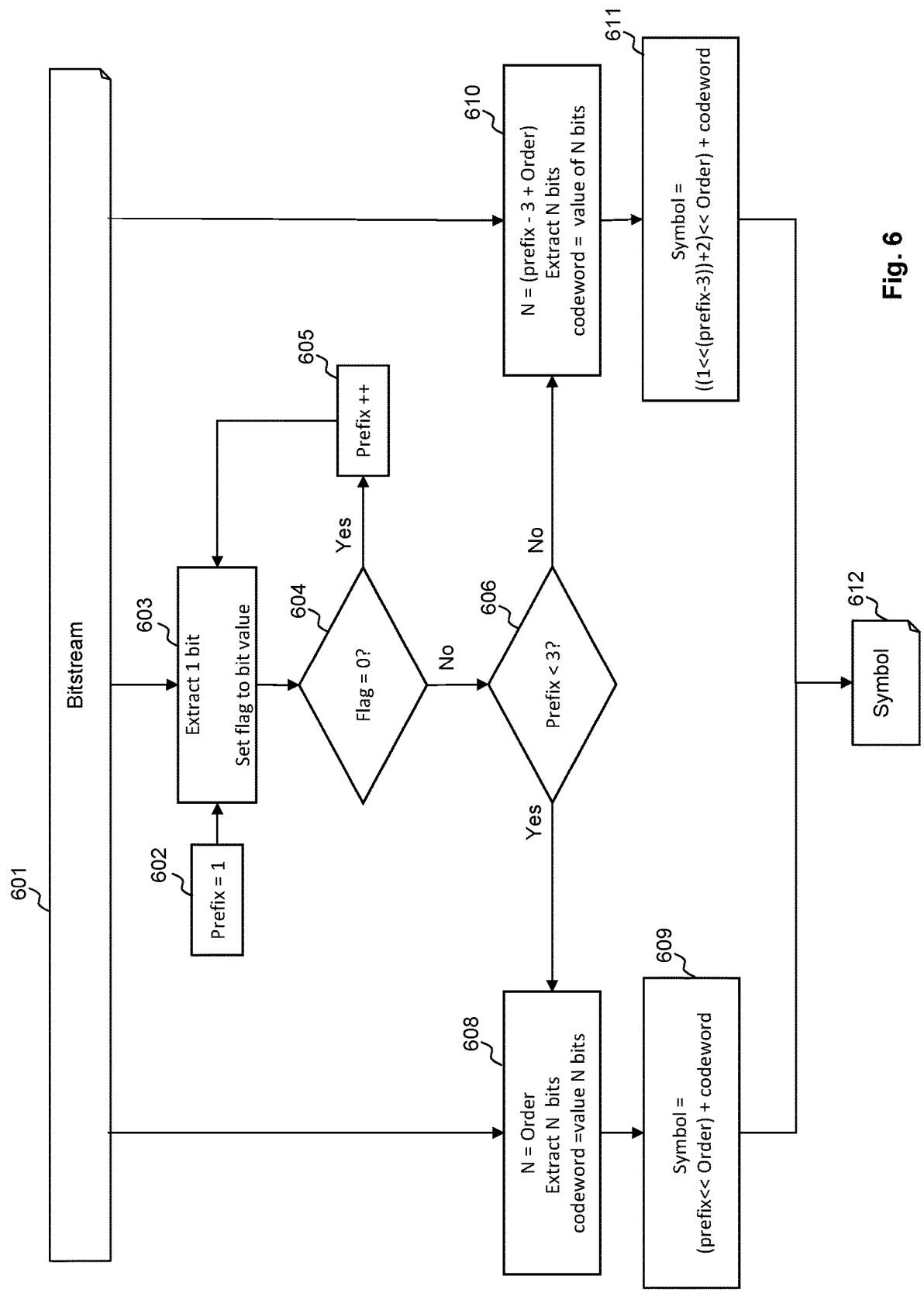
FIG. 6 illustrates the Golomb based binary coding of a syntax element in HEVC.

FIG. 6 illustrates this principle at the decoding side. The input data of the decoding process are the bitstream 601 and the Order which is known as the Rice Golomb parameter, or the Golomb Order. The output of this process is the decoded symbol 612.

The prefix value is set equal to 1 at step 602 then 1 bit is extracted from the bitstream at step 601 and the variable flag is set equal to the decoded value 603. If this flag is equal to 0 at step 604 the Prefix value is incremented 605 and another bit is extracted from the bitstream 603. When the flag value is equal to 1, the decision module 606 checks if the value Prefix is strictly inferior to 3. If it is true, the N=Order bits are extracted 608 from the bitstream 601 and set to the variable "codeword". This corresponds to the Golomb-Rice representation. The Symbol value 612 is set equal to ((prefix << Order)+codeword) as depicted in step 609. Where '<<' is the left shift operator.

If the Prefix is superior or equal to 3 at step 606, the next step is 610 where N=(prefix−3+Order) bits are extracted from the bitstream and set to the variable "codeword" 610. The symbol value 611 is set equal to ((1<<(prefix−3))+2)<< Order)+codeword. This corresponds to the exponential Golomb representation.

In the following, this decoding process, and in a symmetric way the corresponding encoding process, is called Golomb_H with an input parameter corresponding to the Golomb Order. It can be noted in a simple way Golomb_H (Order).

In HEVC, for some syntax elements such as residuals, the Golomb Order is updated in order to adapt the entropy coding to the signal to be encoded. The updating formula tries to reduce the Golomb code size by increasing the Golomb Order when the coefficients have large values. In the HEVC standard, the update is given by the following formula:

Order=Min($c$LastRiceOrder+($c$LastAbsLevel>(3*(1>>$c$LastRiceOrder))?1:0),4)

Where cLastRiceOrder is the last used Order, cLastAbsLevel is the last decoded coeff_abs_level_remaining. Please note that for the first parameter to be encoded or decoded, cLastRiceOrder and cLastAbsLevel are set equal to 0. Morever please note that the parameter Order cannot exceed the value of 4 in this formula. And where the expression (C ? A:B) has the value A if the condition C is true and B if the condition C is false.

The HEVC Range Extension, also commonly called HEVC RExt, is an extension that is currently being drafted of the new video coding standard HEVC.

An aim of this extension is to provide additional tools to code video sequences with additional colour formats and bit-depth, and possibly losslessly. In particular, this extension is designed to support 4:2:2 colour format as well as 4:4:4 video format in addition to 4;2.0 video format (see FIG. 4). A colour image is generally made of three colour components R, G and B. These components are generally correlated, and it is very common in image and video compression to de-correlate the colour components prior to processing the images. The most common format that de-correlates the colour components is the YUV colour format. YUV signals are typically created from RGB representation of images, by applying a linear transform to the three inputs R, G and B input frames. Y is usually called Luma component, U and V are generally called Chroma components. The term 'YCbCr' is also commonly used in place of the term 'YUV'.

It is very common to use different sampling ratios for the three colour components. The subsampling scheme is commonly expressed as a three part ratio J:a:b (e.g. 4:2:2), that describes the number of luminance and chrominance samples in a conceptual region that is J pixels wide, and 2 pixels high. The parts are (in their respective order):

J: horizontal sampling reference (width of the conceptual region) (usually, 4).
  a: number of chrominance samples (Cr, Cb) in the first row of J pixels.
  b: number of (additional) chrominance samples (Cr, Cb) in the second row of J pixels.

Figure 4:
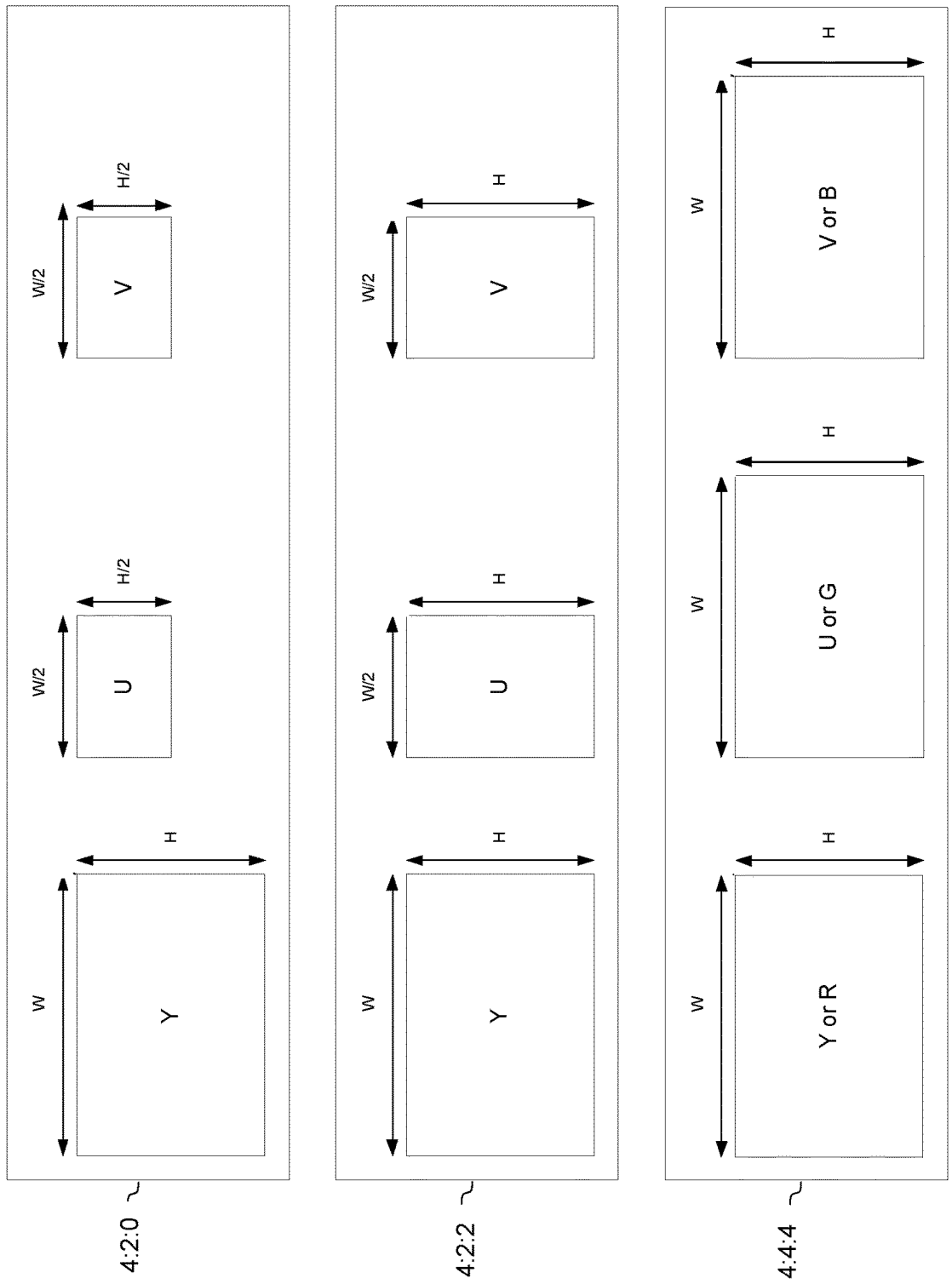
FIG. 4 illustrates Chroma formats supported by HEVC RExt.

FIG. 4 illustrates the different considered Chroma formats in HEVC RExt. These formats are different due to a different picture size of the three colour components, and to a different type of the colour components.

In the 4:2:0 YUV Chroma format, if the Y component region has a width equal to W pixels and a height equal to H pixels, the U and V components regions have both a width W/2 equal to pixels and a height equal to H/2 pixels.

In the 4:2:2 YUV Chroma format, if the Y component region has a width equal to W pixels and a height equal to H pixels, the U and V components regions have both a width equal to W/2 pixels and a height equal to H pixels.

In the 4:4:4 YUV or RGB Chroma format, the regions for three colour components have the same width W and height H.

When a picture is monochrome, its format is named 4:0:0.

Regarding the bit-depth which is the number of bits used to code each colour component of a pixel, if the current HEVC standard is able to deal with 4:2:0 colour format with 8 and 10 bits bit-depth (i.e. 256 to 1,024 possible colours), HEVC RExt is about to be designed to additionally support 4:2:2 and 4:4:4 video format with an extended bit-depth ranging from 8 bits up to 16 bits (i.e. up to 65,536 possible colours). This is particularly useful to have a larger dynamic of colour components.

HEVC RExt is also designed to provide a lossless encoding of the input sequences; this is to have a decoded output 209 strictly identical to the input 101. To achieve this, a number of tools have been modified or added, compared to the conventional HEVC lossy codec. A non-exhaustive list of exemplary modifications or additions to operate losslessly is provided here below:

removal of the quantization step 108 (203 at the decoder);
  forced activation of the bypass transform, as normal cosine/sine transforms 107 may introduce errors (204 at the decoder);
  removal of tools specifically tailored at compensating quantization noise, such as post filtering 115 (207 at the decoder).

For HEVC RExt, the updating formula of the Golomb Order has been further modified in order to be adapted to deal with higher bit-depth and to take into account very high quality required by application dealing with video compression of extended format (4:2:2 and 4:4:4) including lossless coding. For HEVC RExt, the updating formula has been changed as follows:

Order=Min($c$LastRiceOrder+($c$LastAbsLevel>>(2+$c$LastRiceOrder)),7)

With this formula, the maximum value of Order is 7. Moreover, for the first coding of the coeff_abs_level_remaining for a sub-block of Transform block, the Golomb order is set equal to:

Order=Max(0,cRiceOrder−(transform_skip_flag|cu_transquant_bypass_flag?1:2))

where
the variable "transform_skip_flag" is set to 1 if the transform (e.g. DCT 107 or 204) is skipped for the current coding unit and 0 if the transform is used,
the variable "cu_transquant_bypass_flag" is set to 1 if the coding unit is lossless encoded and 0 otherwise,
the variable "cRiceOrder" is set equal to last used Order from another sub-block of the transform block otherwise is set to 0.

Additional tools for HEVC RExt are currently being designed to efficiently encode "screen content" video sequences in addition to natural sequences. The "screen content" video sequences refer to particular video sequences which have a very specific content corresponding to those captured from a personal computer of any other device containing for example text, PowerPoint presentation, Graphical User Interface, tables (e.g. screen shots). These particular video sequences have quite different statistics compared to natural video sequences. In video coding, performance of conventional video coding tools, including HEVC, proves sometimes to be underwhelming when processing such "screen content".

The current tools currently discussed on in HEVC RExt to process "screen content" video sequences include the Intra Block Copy mode and the Palette mode. Prototypes for these modes have shown good coding efficiency compared to the conventional method targeting natural video sequences. Focus is made in this document on the Palette coding mode.

The palette mode of HEVC RExt is a prediction mode. It can be indifferently applied to any other lossless or lossy coding methods. It means that the Palette method is used to build a predictor for the coding of a given coding unit similarly to a prediction performed by motion prediction (Inter case) or by an Intra prediction. After the generation of the prediction, a residual coding unit is transformed, quantized and coded. In other words, the same processes as described above with reference to FIGS. 1 and 2 apply.

Figure 8:
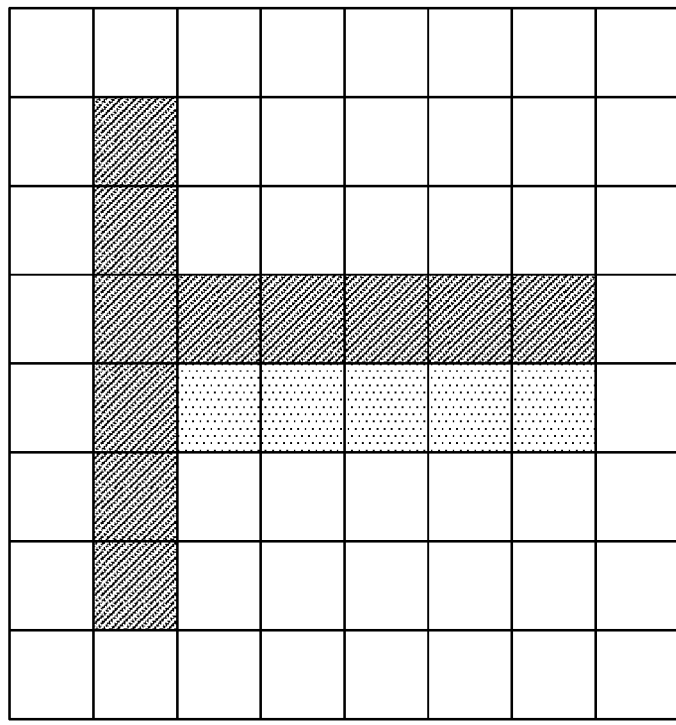
FIG. 8 illustrates an example of coding unit with its corresponding block of levels and the associated palette.

A palette is generally represented by a table containing a finite set of N-tuple of colours, each colour being defined by its components in a given colour space (see for example 803 in FIG. 8 based on YUV colour space). For example, in a typical RGB format, the palette is composed of a list of P elements of N-tuple (where N=3 for a RGB). More precisely, each element corresponds to a fixed triplet of colour components in the RGB format. Of course this is not limited to a RGB or YUV colour format. Any other colour format can be represented by a palette and can use a smaller or a higher number of colour components, meaning that N may be different from 3.

At the encoder side, the Palette mode, under consideration in RExt, consists in transforming pixel values of a given input coding unit into indexes called levels identifying the entries in an associated palette. After the transformation, the resulting coding unit or block is composed of levels and is then transmitted to the decoder with the associated palette, generally a table having a finite number of triplets of colours used to represent the coding unit. Since the palette defines a finite number of colours, the transformation into a block of indexes usually approximates the original input coding unit.

To apply the Palette mode at the encoder side, an exemplary way to transform a coding unit of pixels is performed as follows:
find the P triplets describing at best the coding unit of pixels to encode, for example by minimizing overall distortion;
then associate with each pixel of the coding unit the closest colour among the P triplets: the value to encode (or level) is then the index corresponding to the entry of the associated closest colour.

For each coding unit, the palette (i.e. the P triplets found), the block of indexes or levels and the residual representing the difference between the original coding unit and the block of indexes in the colour space (which is the block predictor) are coded in the bitstream 110 and sent to the decoder.

At the decoder, the Palette mode consists in operating the conversion in the reverse way. This means that each decoded index associated with each pixel of the coding unit is replaced by the corresponding colour of the palette decoded from the bitstream, in order to reconstruct the corresponding colour for each pixel of the coding unit. This is the reconstruction of the block of indexes in the colour space (i.e. of the coding unit predictor). Since the Palette mode is a prediction mode, the associated residual is decoded from the bitstream and then added to the reconstructed coding unit predictor to build the final reconstructed coding unit.

Figure 7:
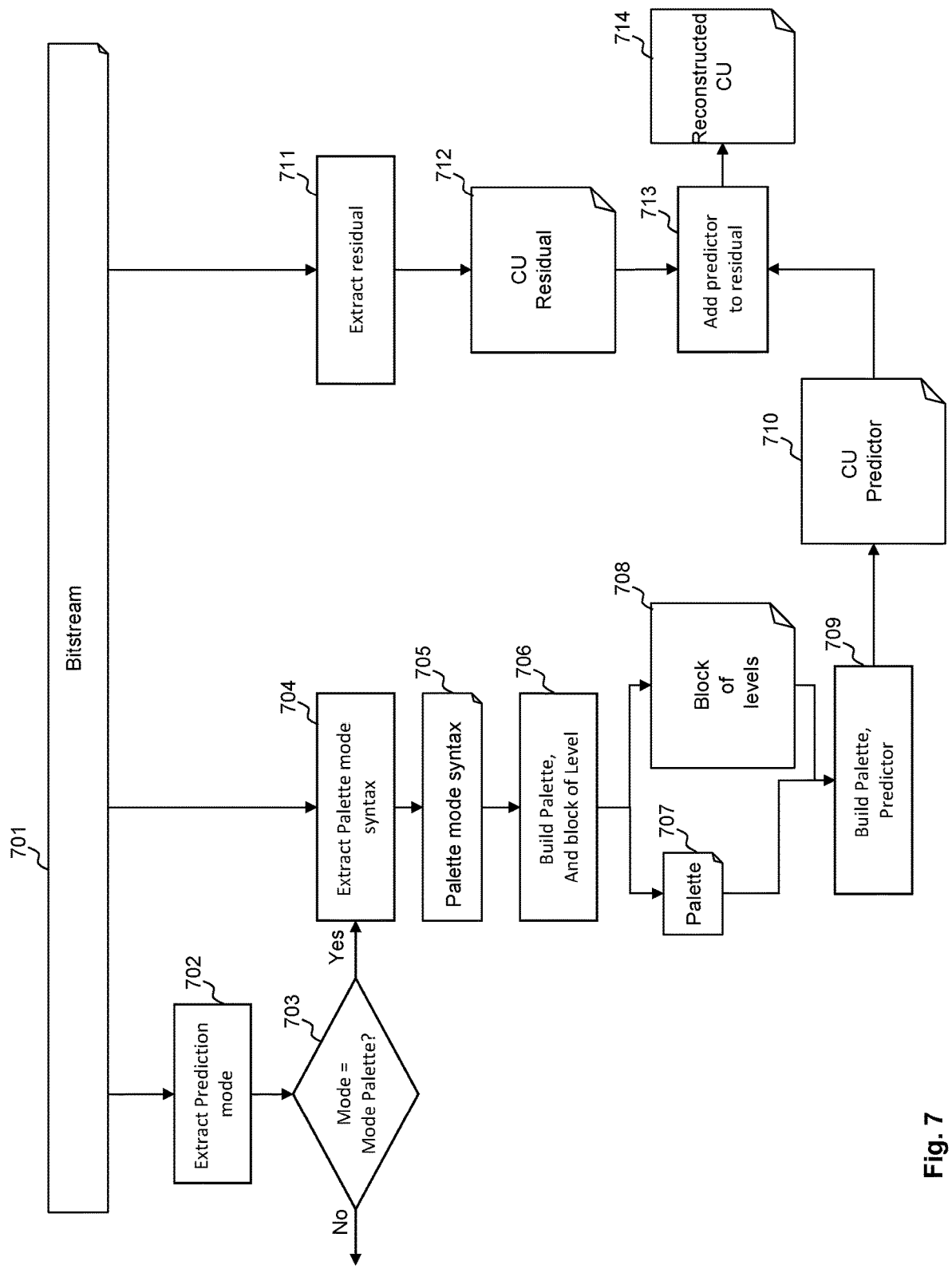
FIG. 7 illustrates the principle of Palette mode prediction at the decoder side under investigation in the Range Extension of HEVC.

FIG. 7 further illustrates the principle of Palette mode at the decoder. The prediction mode for the current coding unit is extracted at step 702 from the bitstream 701. Currently, the Palette mode is identified by a flag located before the skip flag in the bitstream (the other coding modes have been described above with reference to FIGS. 1 and 2). This flag is CABAC coded using a single context. If this mode is the Palette mode 703 then the related syntax of the Palette mode 705, i.e. the information on the palette, the block of levels and the residual, is extracted and decoded 704 from the bitstream 701.

Then, during step 706, two elements are built from the decoded data: the palette 707 and the block of levels 708. From this block of levels and the associated palette, the coding unit predictor in pixel domain 710 is built 709. It means that for each level of the block of levels, a colour (RGB or YUV) is associated with each pixel.

Then the coding unit residual is decoded 711 from the bitstream 701. In the current implementation of the Palette mode, the residual associated with a Palette mode is coded using the common HEVC Inter residual coding method, i.e. using Golomb coding. To obtain the residual 712 of the coding unit, the conventional inverse quantization and inverse transformation are performed. The block predictor 710 is added 713 to this coding unit residual 712 in order to form the reconstructed coding unit 714.

FIG. 8 illustrates the principle of the Palette mode at the encoder. The current coding unit 801 is converted into a block 802 of the same size which contains a level for each pixel instead of 3 colour values (Y, U, V) or (R, G, B). The palette 803 associated with this block of levels is built based on coding unit overall distortion minimization and associates, with each entry, an entry index or level having corresponding pixel colour values. Please note that for monochrome application, the pixel value can contain only one component.

As mentioned in relation to FIG. 7, the palette (as well as the residual) is coded and inserted in the bitstream for each coding unit. In the same way, the block of levels (corresponding to the coding unit predictor) is coded and inserted in the bitstream and an example of the coding is given below with reference to FIG. 9. In this example, the block of levels is scanned in a horizontal order.

The block of levels 91 is exactly the same as the one illustrated in FIG. 8 under reference 802. The tables 92 and 93 describe the successive syntax elements used to code the block of levels 91. Table 93 should be read as the continuation of table 92. The syntax elements in the table correspond to the encoding of the groups of levels surrounded by bold lines in the block 91.

The block of levels is encoded by group of successive pixels in scan order. Each group is encoded using a first syntax element giving a prediction direction, a second element giving the repetition, and an optional third element giving the value of the pixel, namely the level. The repetition corresponds to the number of pixels in the group.

These two tables depict the current syntax associated with the Palette mode. These syntax elements correspond to the encoded information associated in the bitstream with the block of levels 91. In these tables, three main syntax elements are used to fully represent the operations of the Palette mode and are used as follows when successively considering the levels of the block of levels 91.

A first syntax element, called "Pred mode" allows the two encoding modes to be distinguished. In a first mode corresponding to "Pred mode" flag equal to "0", a new level is used for the current pixel. The level is immediately signaled after this flag in the bitstream. In a second mode corresponding to "Pred mode" flag equal to "1", a "copy up" mode is used. More specifically, this means that the current pixel level corresponds to the pixel level located at the line immediately above starting on the same position for a raster scan order. In that case of "Pred mode" flag equal to "1", there is no need to signal a level immediately after the flag because the value of the level is known by reference to the value of the level of the pixel just above in the block of levels 91.

A second syntax element called "Level" indicates the level value of the palette for the current pixel only in the first mode of "Pred mode".

A third syntax element, called "Run", is used to encode a repetition value in both modes of "Pred mode". Considering that the block of levels 91 is scanned from the top left corner to the bottom right corner, row by row from left to right and top to bottom, the Run syntax element gives the number of successive pixels in block 91 having the same encoding.

This "Run" syntax element has a different meaning which depends on the "pred mode" flag. When Pred mode is 0, "Run" element is the number of successive pixels of the predictor block having the same level value. For example, if Run=8 this means that the current "Level" is applied to the current pixel and to the following 8 pixels which corresponds to 9 identical successive samples in raster scan order.

When Pred mode is 1, Run" element is the number of successive pixels of the predictor block having a level value corresponding to the level value of their above pixel in block 91, i.e. where the "copy up" mode is applied. For example, if Run=31 this means that the level of the current pixel is copied from the pixel of the line above as well as the following 31 pixels which corresponds to 32 pixels in total.

Regarding tables 92 and 93, they represent the eight steps to code the block 91 using the Palette mode. Each step starts with the coding of the "Pred mode" flag which is followed by the "Level" syntax element when "Pred mode" flag equals "0", or by the "Run" syntax element when "Pred mode" flag equals "1". The "Level" syntax element is always followed by a "Run" syntax element.

When the prediction mode decoded for the current block is the palette mode, the decoder first decodes the syntax related to this block and then applied the reconstruction process for the coding unit.

Figure 10:
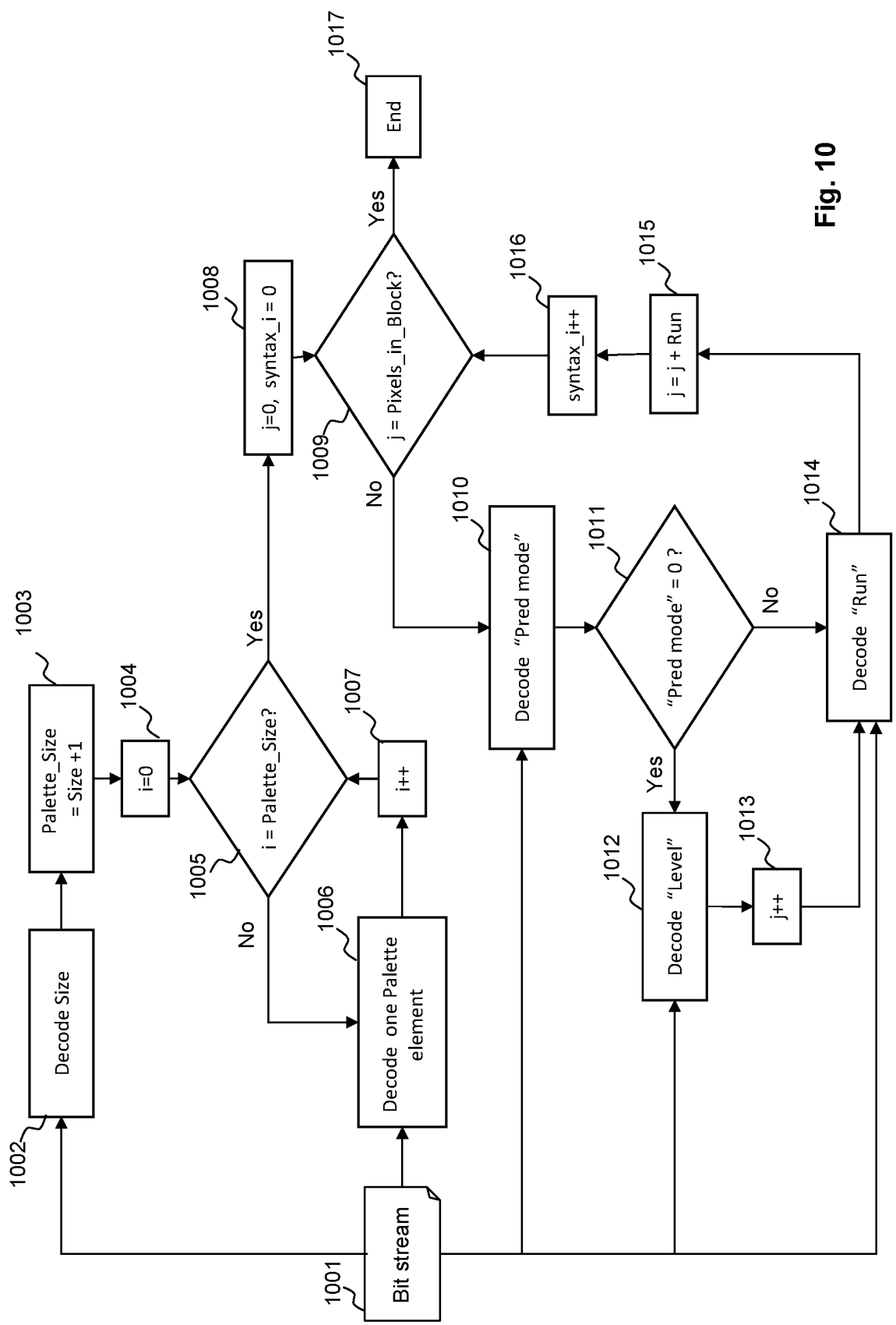
FIG. 10 illustrates the decoding process of the syntax elements related to the Palette mode.

FIG. 10 illustrates the decoding process of the syntax elements related to the Palette mode (steps 705-706 above). First, the size of the palette is extracted and decoded 1002 from the bitstream 1001. The exact size of the palette (Palette_size) is obtained by adding 1 to this size value decoded at step 1002. Indeed, the size is coded by using a unary code for which the value 0 has the smallest number of bits (1 bit) and the size of the palette cannot be equal to 0, otherwise no pixel value can be used to build the block predictor.

Then the process corresponding to the palette values decoding starts. A variable i corresponding to the index of the palette is set equal to 0 at step 1004 next a test is performed at step 1005 to check if i is equal to the palette size (Palette_size). If it is not the case, one palette element is extracted from the bitstream 1001 and decoded 1006 and is then added to the palette with the associated level/index equal to i. Then the variable i is incremented through step 1007. If i is equal to the palette size 1005, the palette has been completely decoded.

Next the process corresponding to the decoding of the block of levels 91 is performed. First, the variable j, corresponding to a pixel counter, is set to 0 as well as the variable syntax_i 1008. Then a check is performed to know if the pixel counter corresponds to the number of pixels contained in the block. If the answer is yes at step 1009 the process ends at step 1017, otherwise the value of the flag "Pred mode" corresponding to one prediction mode is extracted from the bitstream 1001 and decoded 1010.

The value of "Pred mode" is added to a table at the index syntax_i containing all "Pred mode" values decoded. If the value of this "Pred mode" is equal to 0, the syntax element corresponding to "Level" is extracted, at step 1011, from the bitstream 1001 and decoded 1012. This variable "Level" is added to a table at the index syntax_i containing all levels decoded. The variable j corresponding to the pixel counter is incremented by one 1013.

Next the "Run" syntax element is decoded at step 1014. If the syntax element "Pred Mode" is equal to 1, step 1011, the "Run" value is also decoded at step 1014. This syntax element "Run" is added to a table at the index syntax_i containing all the runs decoded.

Next at step 1015, the value j is incremented by the value of the run decoded at step 1014. The variable syntax_i is incremented by one to consider the next set of syntax elements. If the counter j is equal to the number of pixels in the block then the syntax to build the block of levels 91 is finished 1017. At the end of this process related to the Palette, the decoder knows the palette, and the tables containing the list of all the "Pred mode", "Level" and "Run" syntax elements associated with the Palette mode of this coding unit. The decoder can then proceed with the reconstruction process of the coding unit as described through FIG. 7.

Each palette element, constituted by three values (YUV or RGB) in the above examples, is generally encoded using three binary codes. The length of the binary codes corresponds to the bit-depth of each colour component. The palette size is typically encoded using unary code. The "Pred mode" element is encoded using one bit. The "Level" element is encoded using binary code with binary code length equal to b, where $2^b$ is the smallest integer equal to or above the palette size. And the "Run" element is encoded using Golomb_H(Order=3) as explained above in relation to FIG. 6.

Figure 11:
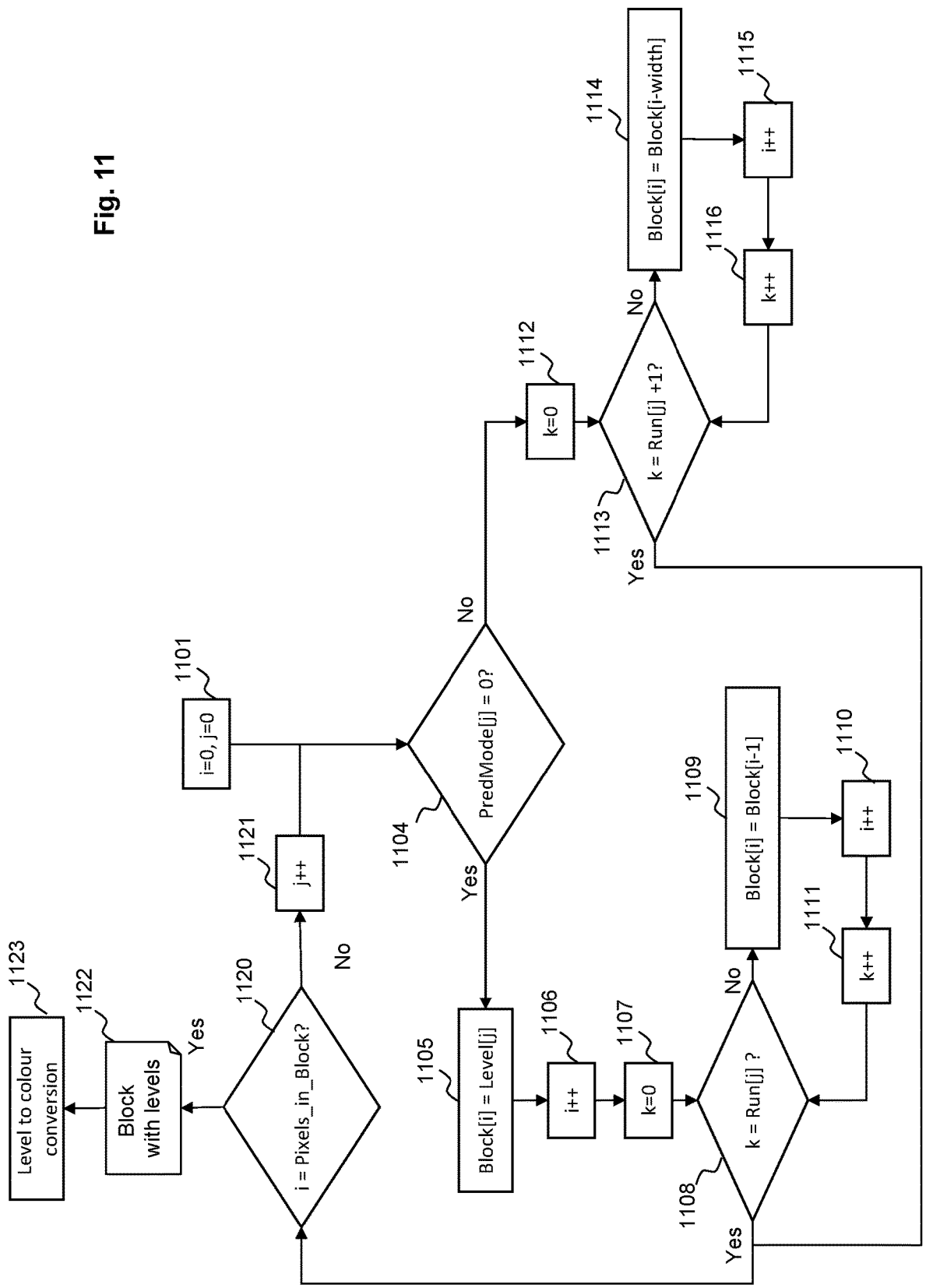
FIG. 11 illustrates the reconstruction process to build the block of levels at the decoding side.

FIG. 11 illustrates the reconstruction process to build the block of levels 91 and then the block predictor in the colour space that has to be used as predictor. The input data of this process are the tables obtained in the process of FIG. 10 above, and containing the list of "Pred mode", "Level" and "Run". An additional input data is the size of the coding unit 801 (which is the same as the size of the block of levels 802/91) known from the quadtree (FIG. 5) signalled in the bitstream.

In a first step 1101, a variable i, representing a pixel counter, is set equal to 0 and a variable j, to successively consider each set of syntax elements, is also set equal to 0. At step 1104, the element Pred_mode[j] extracted from the table of "Pred mode" at index j is checked against 0.

If it is equal to 0, a new level is encoded for the current pixel i. As a consequence, the value of the pixel at position i is set equal to the level at the index j from the table of levels; Block[i]=Level[j]. This is step 1105. The variable i is incremented by one at step 1106 to consider the next pixel, and the variable k, dedicated to count the pixels already processed in the current Run, is set equal to 0 at step 1107.

A check is performed at step 1108 to determine whether or not k is equal to the "Run" element of the table of runs at the index j: k=Run[j] ?. If not equal, the level of the pixel at position i is set equal to the level value of the pixel at position i−1: Block[i]=Block[i−1]. This is step 1109. The variable i and the variable k are then incremented by one at respectively steps 1110 and 1111. If k=Run[j] at step 1108, the propagation of the left level value is finished and step 1120 is performed (described below).

If Pred_mode[j] is different from 0 at step 1104, the "copy up" mode starts with the variable k set equal to 0 at step 1112. Next, step 1113 checks whether or not (k−1) is equal to the "Run" element of the table of runs at the index j: k=Run[j]+? If not equal, the level value of the pixel at position i is set equal to the level value of the pixel at position i of the above line: Block[i]=Block[i−width], where "width" is the width of the block of levels (the same as the coding unit) as deduced from the input size of the coding unit. This is step 1114. Next, the variable i and the variable k are each incremented by one at respectively steps 1115 and 1116. If k=Run[j]+1 at step 1113, the prediction mode 'copy up' is completed and the process goes on at step 1120.

At step 1120, a check is performed to determine whether or not the variable i is equal to the amount of pixels in the block 91/CU 801. If not equal, the variable j is incremented by one at step 1121 to consider the next set of syntax elements and the process loops back to step 1104 described above.

If all the pixels have been processed at step 1120, the final block of levels 91 is obtained at step 1122: this corresponds to table Block[ ]. Then a final step 1123 consists in converting each level in colour values using the palette 803 decoded using the process of FIG. 10. This final step affects pixel values (Y, U, V) or (R, G, B) at each block position according to the level of this position in the block and the corresponding entries in the palette.

Other aspects of the palette mode as introduced in HEVC RExt regard the determination by the encoder of the palette to be used to encode the current coding unit (see FIG. 12 below), and the selection of the Pred mode, Level and Run syntax elements at the encoder (see FIG. 13 below).

Figure 12:
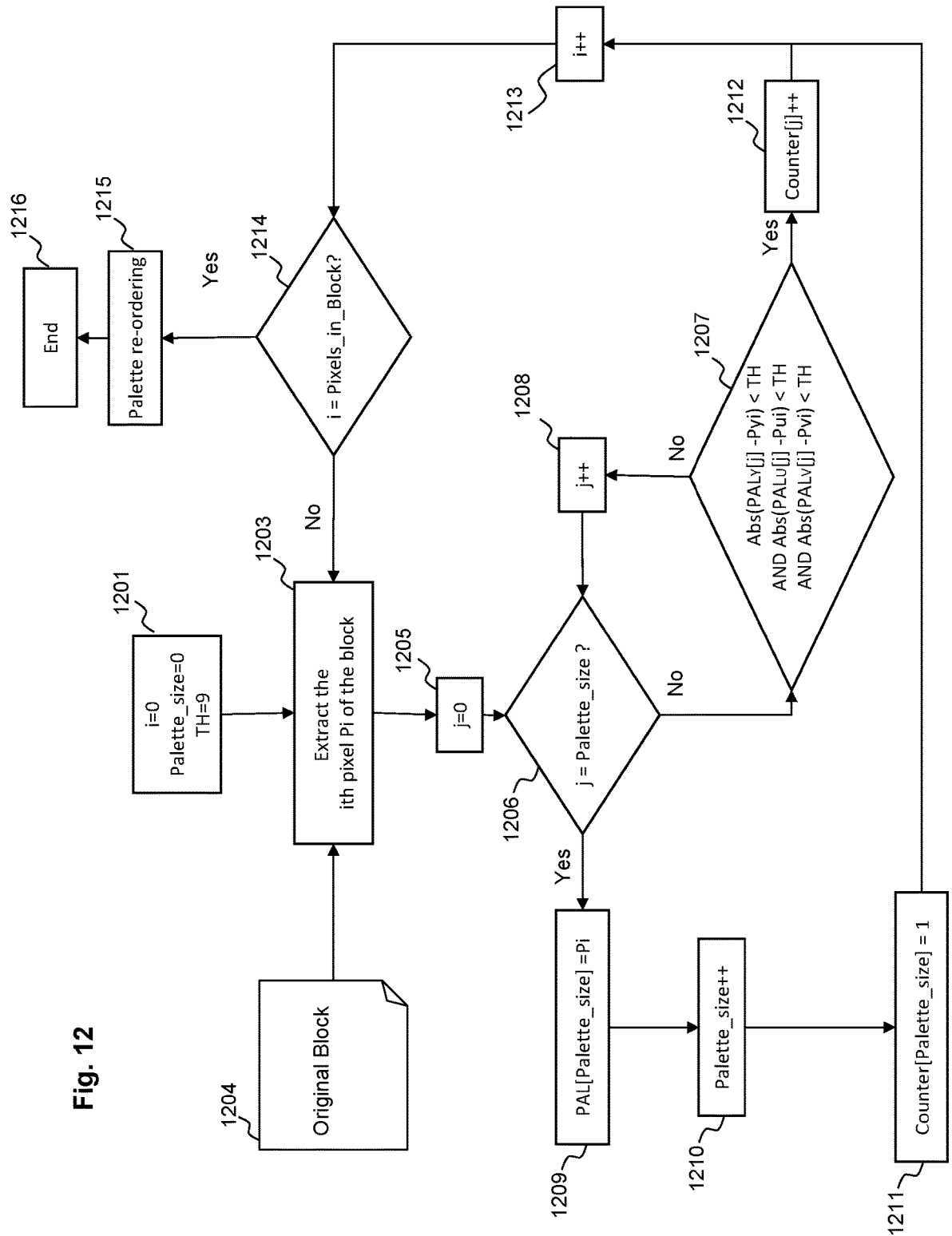
FIG. 12 illustrates an exemplary palette determination algorithm at the encoder.

FIG. 12 illustrates an exemplary palette determination algorithm at the encoder. The input data of this process are the original coding unit of pixels and its coding unit size. In this example, a YUV palette is built, but other implementations may result in having a RGB palette built in the same way.

At a first step 1201, a variable j representing a pixel counter is set to 0, a variable "Palette_size" to follow the growth of the palette as it is being built is also set to 0, and a variable "TH" representative of a threshold is defined, e.g. set to 9 for lossy coding, or 0 in case of lossless coding. Indeed, in lossless coding, quantization is skipped entirely and QP is artificially set to e.g. 0. This lossless property may be defined at the CU level (syntax element cu_transquant_bypass_flag is present and set to 1 if the syntax element transquant_bypass_enabled_flag at Picture Parameter Set-level (PPS-level) is set to 1).

In any case, it is reminded that if the coding unit CU is losslessly coded, then the error limit is set to 0, as the goal here is to guarantee that a level represents a pixel without any mismatch. Then at step 1203, the pixel $p_i$, i.e. having the index i according to a scanning order, is read from the original coding unit 1204. Then the variable j is set equal to 0 at 1205 and at step 1206 a check is performed to determine whether or not the palette size is equal to the variable "j" (meaning that all the palette elements of the palette under construction have been considered).

If the palette size is equal to j, the palette at the index "j" is set equal to the pixel value $p_i$ at step 1209. This means that the current pixel $p_i$ becomes a new element in the palette, with index j associated with it. More precisely the following assignment is performed:

$PAL_Y[j]=(Yi)$
$PAL_U[j]=(Ui)$
$PAL_V[j]=(Vi)$ where $PAL_{Y,U,V}$ are three tables to store the colour values.

The palette size (Palette_size) is incremented by one at step 1210 and an occurrence table Counter is set equal to 1 for the index 'Palette size' at step 1211. Then the variable i is incremented by one at step 1213 to consider the next pixel "i" of the current coding unit. A check is then performed at step 1214 to determine whether or not all the pixels of the current coding unit have been processed. If they have all been processed, the process is completed by an ordering step 1215 explained later on, otherwise the next pixel is considered at step 1203 described above.

The processing branch made of steps 1203 to 1206 and 1209 to 1211 iteratively considers each pixel of the block to add, to the palette, a new element having the value of the considered pixel each time the considered pixel is too far from all the element or elements already in the palette under construction (test 1207).

Back to step 1206, if j is different from palette_size, step 1207 is performed where the absolute value, for each colour component, of the difference between $p_i$ and the palette element at the index j is computed. The formulas are shown in the Figure. If all the absolute differences are strictly less than the predefined threshold TH, the occurrence counter regarding the element "j" in the palette is incremented by one at step 1212. Step 1207 creates a class for each element of the palette under construction, such a class encompassing colours neighbouring the colour of the element, given the margin TH. Thus step 1212 counts the occurrences of each class. Step 1212 is followed by step 1213 already described.

The processing branch made of steps 1203 to 1207 and 1212 iteratively considers each pixel of the block to increment a counter associated with a palette element that is close enough to the considered pixel.

If the condition of step 1207 is not met, the variable j is incremented by one at step 1208 to consider the next palette element in the palette under construction. This is to compare the other palette colour elements to the current pixel through new occurrence of step 1207. If no element in the palette meets the criterion of step 1207, a new element is added to the palette as described above with reference to steps 1209, 1210 and 1211.

One may note that the decision module 1207 can compare each colour component for a 4:4:4 (YUV or RGB) sequences and can only compare either the Luma colour component or the chroma colour Components for 4:2:0 sequences.

At the end of the process of FIG. 12, the table "Counter" contains the number of occurrences of the classes defined by the respective palette elements. Then the palette elements are ordered at step 1215 according to their occurrences so that the most frequent element is in the first position (entry with the lowest index or "level") in the palette.

One may also note that the size of the palette can be limited to a maximum size, for example 24 entries. In such a case, if the size of the palette resulting from step 1215 exceeds 24, the palette is reduced by removing the elements (entries) from the 25$^{th}$ position in the ordered palette. It results that a palette has been built.

Figure 13:
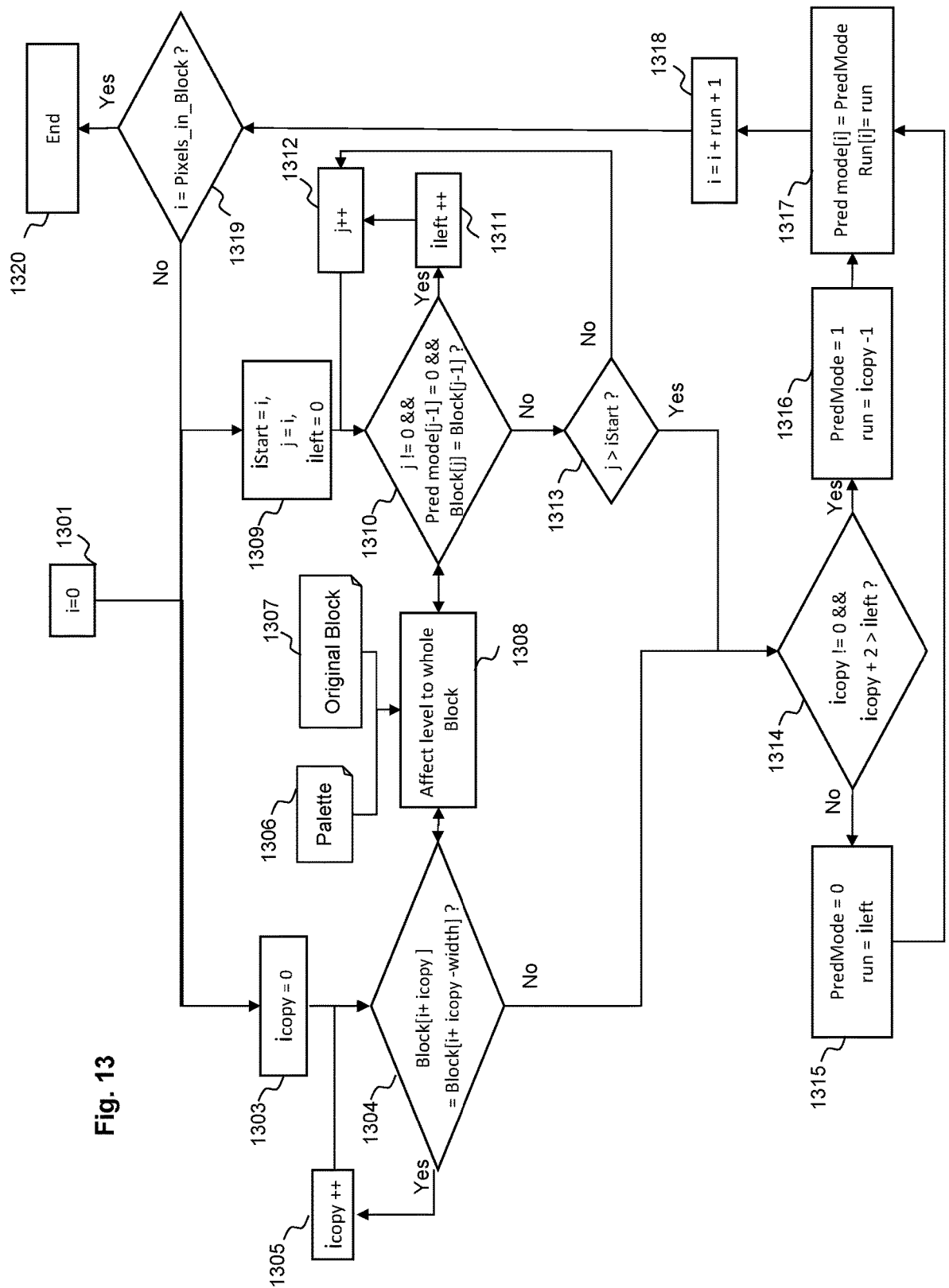
FIG. 13 illustrates the selection of the Pred mode, Level and Run syntax elements at the encoder for the Palette mode.

Turning now to the selection of the Pred mode, Level and Run syntax elements at the encoder, input data of the process of FIG. 13 are the original coding unit of pixels, the palette as built through the process of FIG. 12 and the coding unit size. In particular, this evaluation is performed when determining which coding mode between INTRA coding, INTER coding and Palette coding has to be used.

At a first step 1301, the variable "i" representing a pixel counter is set to 0. The process described below seeks to determine the syntax elements for the pixels starting from i. The two modes of prediction are evaluated independently: "Pred mode"=0 on the right hand part of the Figure, and "Pred mode"=1 on the left hand part of the Figure.

For the 'copy up' prediction (corresponding to "Pred mode"=1), the variable "$i_{copy}$" used to count the number of levels in the current Run is set equal to 0 at step 1303. Then at step 1304 the current level at pixel location i:Block[i+$i_{copy}$], is compared to the level of the pixel located just above in the above line: Block[i+$i_{copy}$–width], where "width" corresponds to the width of the current coding unit. Note that the level Block[i+$i_{copy}$] of each pixel of the coding unit is determined in parallel at step 1308. This step consists in associating with the pixel at the position i, the closest palette element (in practice its index or level) as already explained above. In a variant, this step may consist in selecting the first palette element for which a distance with the pixel at position i is below a predefined threshold. This step uses the position i, the palette 1306 and the original coding unit 1307.

If Block[i+$i_{copy}$]=Block[i+$i_{copy}$–width] at step 1304, the variable "$i_{copy}$" is incremented by one at step 1305 to consider the next pixel value of the block of pixels and to indicate that the current pixel level at position i+$i_{copy}$ can be included in the current "copy up" Run. If Block[i+$i_{copy}$] is different from Block[i+$i_{copy}$–width] at step 1304 meaning that the current evaluation of a "copy up" Run has ended, the variable "$i_{copy}$" is transmitted to the decision module 1314. At this stage of the process, the variable "$i_{copy}$" corresponds to the number of values copied from the line just above.

For the left value prediction (corresponding to "Pred mode"=0), the loop to determine the Run value ($i_{left}$) is processed in parallel or sequentially. First the variable "$i_{start}$" used to store the index i of the current pixel is set to "i", and the variable "j" used to consider successively the pixel levels following index "i" is also set equal to "i" and the variable "$i_{left}$" used to count the current Run under construction is set equal to 0. This is step 1309. Next, step 1310 consists to determine whether or not j !=0 and "Pred_mode[j−1]"=0 and Block[j]=Block[j−1]. Pred_mode[ ] is a table used by the encoder to store the prediction mode (either 1 or 0 for respectively the "copy up" prediction and the left value prediction). It is filled up progressively at step 1317 described below as the successive pixels are processed, and has been initialized with zero values for example at step 1301: Pred_mode[k]=0 for any k.

If the condition at step 1310 is met, the variable "$i_{left}$" incremented by one at step 1311 to indicate that the current pixel level at position j can be included in the current "left value" Run, and the variable j is incremented by one at step 1312 to consider the next pixel value of the block of pixels.

If the condition at step 1310 is not met, the variable "j" is compared to "$i_{start}$" to determine if it is the first pixel value to be examined for the current "left value" Run. This is step 1313. If "j" is equal to or less than "$i_{start}$", meaning that it is the first pixel value to be examined for the current Run, then it starts the current Run and the next pixel value is considered at step 1312 described above. If "j" is strictly higher than "$i_{Start}$", meaning that a first pixel value different from the pixel value of the current "left value" Run has been detected, the variable "$i_{left}$" corresponds to the length of the current "left value" Run is transmitted to the decision module 1314. Note that, as the loop for "copy up" prediction, the level Block[i] at the index i is determined in the same loop at step 1308.

After having computed the maximum run for the 'left value prediction' and the 'copy up' mode, the variable "$i_{left}$" and "$i_{copy}$" are compared at step 1314. This is to determine whether or not $i_{copy}$38?=0 and "$i_{copy}$"+2 is higher than "$i_{left}$". This is an exemplary criterion to select either the copy up mode or the left value prediction mode. In particular, the parameter "2" used to compensate the rate cost of the level of the left value prediction mode may be slightly changed. In particular, the additive parameter (2 in this example) may be made dependent on the size of the palette (Palette_size) because the latter is directly related to the cost of the level. In one embodiment, the operation "+2" is removed in order that comparison of step 1314 checks: "icopy !=0 && icopy>ileft". This embodiment improves the coding efficiency.

The condition at step 1314 means that if "$i_{copy}$" is equal to 0 or is smaller than or equal to $i_{left}$−2, the "left value prediction" mode is selected at step 1315. In that case, a "PredMode" variable is set equal to 0 and a Run variable is set equal to "$i_{left}$" at same step 1315. On the other hand, if "$i_{copy}$" is different from 0 and is strictly higher than "$i_{left}$−2", the "copy-up" mode is selected at step 1316. In that case, the "PredMode" variable is set equal to 1 and the Run variable to $i_{copy}$−1 at step 1316.

Then the tables containing the "Pred_mode" and the "Run" at the encoder are updated with the current value "Pred_mode" and "Run", at step 1317. Then, the next position to consider in the block of pixels is computed at step 1318, which corresponds to the current position i incremented by the "run" value +1. Then a check is performed at step 1319 to determine whether the last pixels of the coding unit have been processed. If it is the case, the process ends at step 1320, otherwise the evaluation of the two prediction modes "left prediction" and "copy up" are evaluated starting at steps 1303 and 1309 for the next pixel position to obtain a new set of syntax elements.

At the end of this process, the encoder knows the levels for each sample or pixel of the coding unit, and is able to encode the corresponding syntax of the block of levels based on the content of the three tables Pred_mode[ ], Block[ ] and Run[ ].

To determine the block predictor, the encoder then converts the defined block of levels using the palette.

Figure 15:
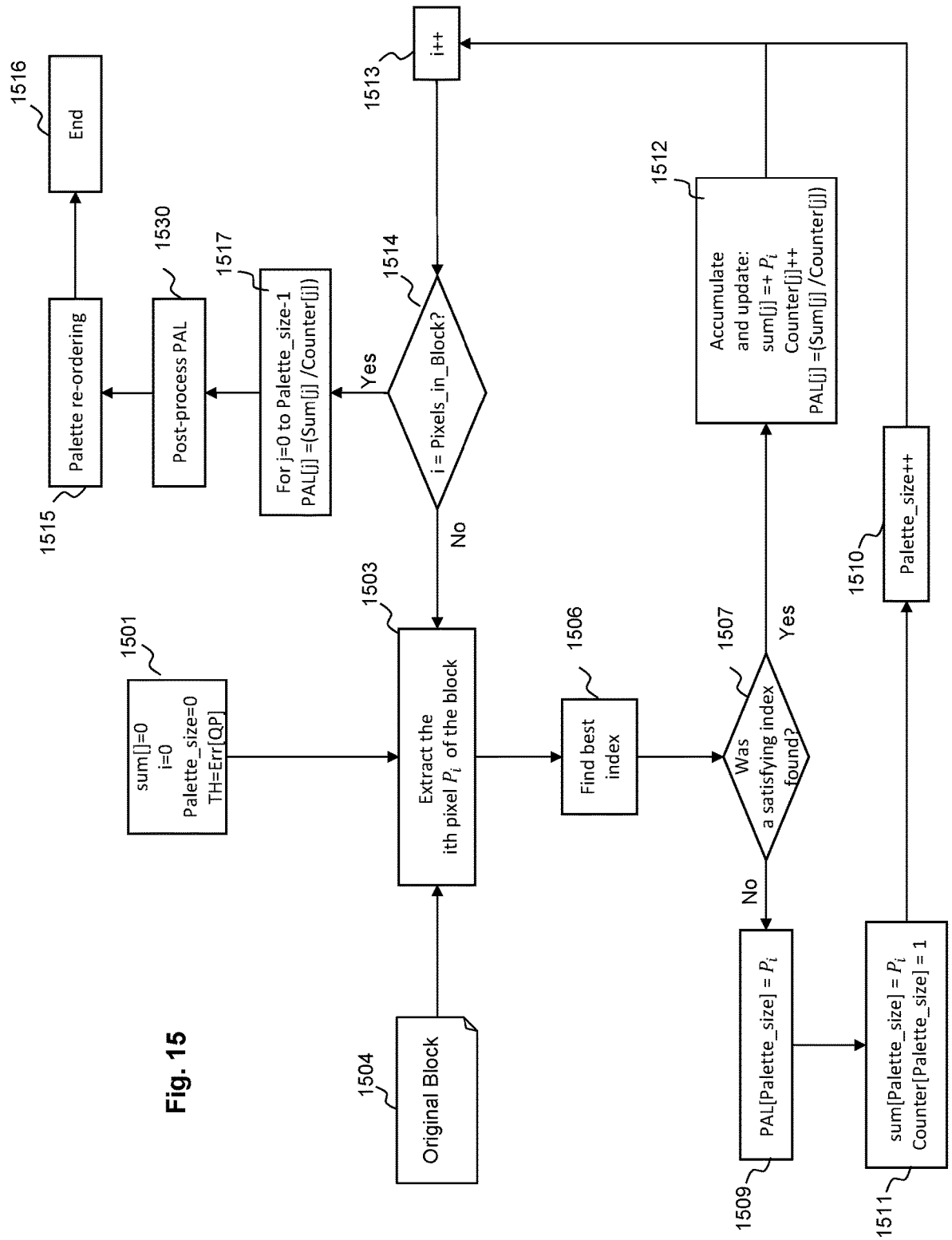
FIG. 15 illustrates a palette determination algorithm at the encoder according to embodiments of the invention.

FIG. 15 illustrates a palette determination algorithm at the encoder with the same representation as in FIG. 12. So the input data are the same, and as a result a palette is generated.

Contrary to FIG. 12, where the palette elements or entries are the values of the first pixels considered as too far from the other palette element, an idea of the algorithm of FIG. 15 is to use mode relevant palette element. To do so, upon incrementing the counter (i.e. at each iteration considering a new pixel $P_i$ of the block that is close to an already existing palette element), possibly depending on a criterion on the counter value, its associated palette element is modified into a modified palette element that depends on all the pixels for which the counter has already been incremented.

The steps 15xx are identical to steps 12xx, except steps 1501, 1511 and 1512 which are modified versions of steps 1201, 1211 and 1212, steps 1506 and 1507 which replace steps 1205 to 1208, and optional steps 1517 and 1530 which are new.

As shown in the Figure, step 1501 provides, in addition to initializing the variables i and Palette_size, the initialization to zero of another variable sum[ ]. sum[e] is used to sum the values of all the pixels that are determined close to palette element 'e' at step 1507 (e.g. the criterion of step 1207).

Although step 1501 may set threshold TH to a predefined value such as 9 as explained above with respect to step 1201, threshold TH may also be adapted to the image quality and depend on a coding parameter. This is shown in FIG. 15 with TH=Err(QP) where Err is a function and QP is a quantization parameter, for example the quantization step used at step 108 (FIG. 1). Using the quantization parameter makes it possible to follow the quality targeted for the current block.

Note that the function Err may be stored as a look-up table, for example pre-computed and derived from quantization errors for various QP. In a variant, such table may be experimentally determined and optimized. In addition, the table ideally holds a value of 0 for QP=0 so as to satisfy lossless coding requirements.

In one embodiment, threshold TH is set equal to the quantization step q used in the transform Skip mode of HEVC. For a transform Skip block, all coefficients are de-quantized uniformly. In the HEVC standard, the quantization is quite complex and it depends on several parameters. An easy way to obtain the quantization step q for threshold TH is to use the de-quantization function of the transform skip with a coefficient of magnitude 1. This is because the de-quantized coefficient of magnitude 1 gives the quantization step q.

It may also be noted that the quantization step depends on the size of the transform. So in a simple implementation, the transform size is set always equal to the 4×4 size. In that case, if the QP is set for the whole image, the quantization step q is determined only once for the whole image.

In a specific embodiment, threshold TH is set equal to α.q, for example α is equal to ¾ or α depends on the size of the current block.

In another specific embodiment, threshold TH depends on the Lambda of the rate distortion criterion used to compare the palette mode to other coding modes (step 106 in FIG. 1).

This approach thus selects the first element considered in the palette that is close to the considered pixel given the distance threshold.

In case of lossless coding, most of the time the value of QP is equal to 0, resulting in that the value of TH, which is equal to Err[0], is usually 0. This has an impact on steps 1507, 1512, 1517 and 1530. For instance, in step 1507, TH=0 implies that a new pixel value is systematically added in to the Palette (through steps 1509 to 1511). Some post-processing operations (1530) may also be forbidden given the lossless coding does not allow any approximations. This is understood by the man skilled in the art.

Back to the process, when iteratively considering each pixel $P_i$ of the current block, step 1506 determines the best level, i.e. palette element, to describe current pixel $P_i$.

For instance, it can be the first palette element that is distant at most of TH from $P_i$, as shown in step 1207.

In a variant, all the palette elements may be considered, and the one having the smallest distance to the current pixel $P_i$ is selected. In other words, it is selected the closest palette element to the considered pixel from amongst all the elements already in the palette.

To statistically reduce the number of palette elements to test, an alternative approach for step 1506 is to consider at the very first position, the palette element that has been output at step 1506 for the previous pixel. In other words, the very first element considered in the palette to determine a distance with the considered pixel is the palette element, the associated counter of which has been incremented for the pixel previously considered.

In practice, the last palette element found at the previous occurrence of step 1506 is stored and tested first upon new occurrence of the same step. As a consequence, it may not be needed to test the other palette elements. Step 1506 thus verifies whether the palette element found can represent the current pixel with sufficient accuracy.

Note that the distance between the considered pixel and any palette element may be a L1 distance or a L2 distance between their values, involving the one or more colour components. Thus this distance is compared to distance threshold TH to determine closeness between the considered pixel and a palette element.

In case no palette element has been found at step 1506 (test 1507 is negative), the current pixel is added as a new palette element (step 1509 similar to step 1209) and the variable counter for this new palette element is set equal to 1 (similar to step 1211). In addition at step 1511, the variable "Sum" for the new palette element is set equal to the value of the current pixel Pi (for each colour component if appropriate).

In case a palette element T has been considered as close to the current pixel $P_i$ at step 1506 (test 1507 is positive), the counter at index j, Counter[j], is incremented by one (similar to step 1212). The palette element is also updated based on the pixel values of all the pixels already classified in the class of palette element j. This is step 1512.

Preferably, each colour component of the current pixel Pi is added to each colour sum of the variable sum at the index j: "Sum[j]=+Pi" for each Y, U, V component. Next, the sum result is divided by the current value of counter Counter[j]. And the division result is used as the new value for palette element j:

Pal[j]=sum[j]/Counter[j], for each Y, U, V colour components if any.

In other words, modifying the palette element comprises summing the value of the considered element with the values of all the pixels for which the associated counter has already been incremented, and dividing the sum by the value of the associated counter to obtain the value of the modified palette element.

In a specific embodiment, the update of the palette element j is performed only when Counter[j] meets a predefined criterion, for instance when the associated counter is a power of two. Considering such criterion advantageously allow a palette element update at low cost. For example this is because the division by Counter[j] can be implemented using hardware shift units.

In a variant, the median value of all the pixels belonging to class "j" may be used to update palette element j. In other words, the value of the modified palette element is the median value of the pixels for which the associated counter has been incremented. This can be done during e.g. step 1512 (and/or step 1517 described below) by maintaining the set of different pixel component values and their count, sorting them in value order (decreasing or increasing) and thus deducing the median component value.

In another variant, the most probable pixel value from amongst all the pixels belonging to class "j" may be used to update palette element j. In other words, the value of the modified palette element is the most frequent value of the pixels from amongst the values of the pixels for which the associated counter has been incremented. This can be achieved in a similar way to the median value, except the component value with most occurrences is selected.

The man skill in the art can choose any other averaging methods to process the step 1512, e.g with a specific rounding when calculating PAL[j].

When all the pixels have been considered (step 1514), step 1517 is performed to modify each of the palette entries or elements as described above for step 1512, i.e. by computing a mean value: Pal[j]=sum[j]/Counter[j], or selecting the median value or the most probable value from the pixel values belonging to the class "j" of the considered palette entry/element, or any other averaging method. This makes it possible to obtain an averaging of each palette element based on all the pixels that belong to their respective class (because the averaging of step 1512 is not always done).

Next to step 1517, an optional post-processing 1530 of the palette can be performed. Such post-processing may include adding or removing or modifying some of the palette elements. Examples of such post-processing are given below with reference to FIGS. 16 and 17.

In the approach of FIG. 15, when building a palette, each time a new pixel is added to the class a palette entry defines (and possibly if the counter value meets a criterion such as being a power of two), the palette entry may be modified to take the means value of the pixels belonging to such class.

In a variant, step 1512 may systematically provide the averaging operation on the palette element, i.e. regardless of the criterion on the counter value. In such situation, step 1517 is no longer required since the same operation has been made by step 1512 for each class.

Figure 16:
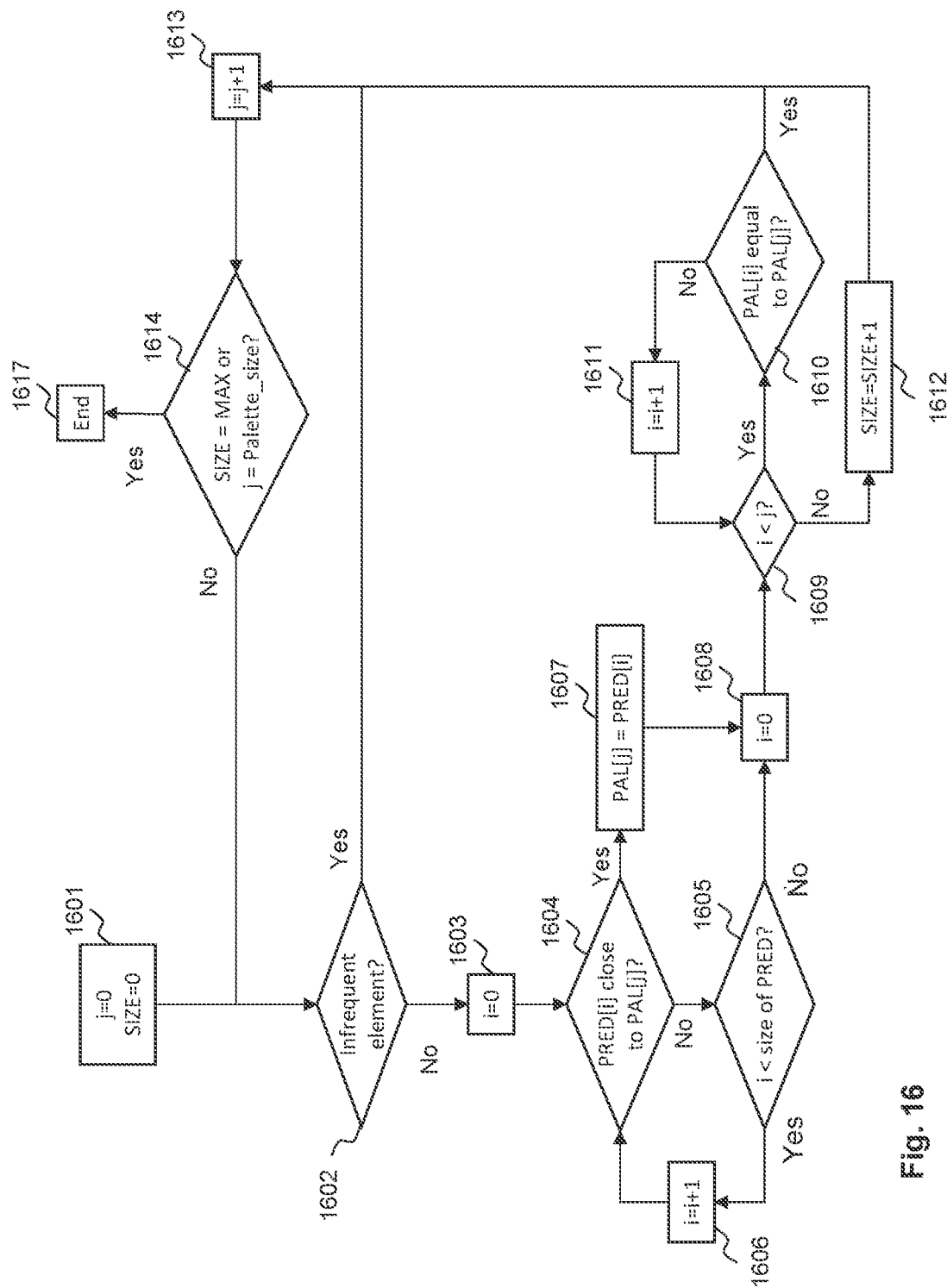
FIG. 16 illustrates embodiments for a post-processing of a palette according to embodiments of the invention.

FIG. 16 illustrates embodiments for said post-processing. This may be the post-processing step 1530 of FIG. 15, but also a similar post-processing step that may occur between steps 1215 and 1216 of FIG. 12.

In one embodiment, the post-processing of FIG. 16 takes place in a process for determining a palette as described above with reference to FIG. 12 where a step 1217 is provided between steps 1214 and the post-processing, similar to step 1517 described above. This approach may require step 1211 to initialize sum[Palette_size] to the value of $P_i$, and step 1212 to add the value of $P_i$ to sum[j].

This averaging or modification is made independently for each colour component of the palette entries or elements.

As a post-processing, the algorithm of FIG. 16 receives an input palette from step 1514 or 1217 as input, and outputs an output palette for step 1515 e.g., An idea of this algorithm is to set the pixel value of an entry of the input palette to a predetermined value if a predetermined criterion on the entry is met. The algorithm as depicted in FIG. 16 specifically focuses on using a predetermined criterion based on a palette predictor. In details, when the current palette (used to build a block predictor) is predicted using a palette predictor, the entry of the input palette is substituted with an entry of the palette predictor. In particular, the predetermined criterion may include that the entry of the input palette and the entry of the palette predictor are close one to each other compared to a predefined threshold.

Step 1601 initializes the post-processing operation by setting the output palette size SIZE to 0 and an entry index "j" to 0 to successively consider each current palette element (or entry).

Next, step 1602 checks whether the palette entry j is frequent or not (or useful or not). This check may be based on the value of Counter[j] as defined in FIG. 12 or 15 (i.e. the number of occurrences of Class "j").

In a variant, a rate-distortion criterion may be used to determine which palette entries are useful. This is because not having some pixels described by a palette entry (i.e. encoded using corresponding "levels") can result in a different coding method being used to encoded the block. Thus alternative distortion and rate (e.g. Lagrangian cost) corresponding to the non-use of a given palette entry can be determined, and thus the rate-distortion criterion for both the palette and alternate coding methods. As a result, the costs can be compared and the decision be made if the palette entry is worth keeping.

If the palette entry is not worth keeping (it is infrequent or useless), the algorithm goes on step 1613 by selecting the next palette entry.

One can see that step 1602 causes entries of the input palette not to be inserted in the output palette, and has the advantage to be a simple method to achieve this. This step causes the removal of an entry of the input palette based on a frequency of use of the entry by the pixels of the blocks or based on a rate-distortion criterion.

Next, steps 1603 to 1607 correspond to an embodiment for modifying the input palette by using a reference set PRED of palette elements.

This reference set may be an actual predictor for the current palette, used to encode it, and built for example from predetermined palette elements or from the palette used for the previous block of pixels. That means that the palette will be encoded by reference to the palette predictor: the difference between them (i.e. the residual) and an identifier of the palette predictor if any are sent in the bitstream.

In a variant, the reference set may also be determined by the encoder as being the most frequent palette elements or more generally predetermined palette elements value.

The main benefit of using the set PRED is to generate palette elements for the output palette that are more representative of the content of the block of pixels, and/or is to reduce signaling.

Below, the description is made with reference to PRED as a palette predictor for ease of explanation.

Back to the Figure, at step 1603, the first element of PRED is selected.

Next, step 1604 compares the current palette and predictor elements. This comparison maybe be based solely on the values of PRED[i] and PAL[j], e.g. the absolute difference (in a variant a L2 distance) between their values is at most N (for example 1).

In a variant to the use of a L1 or L2 distance, the comparison involves comparing the Lagrangian costs of using the original palette element values and using the predictor element values in their stead. Of course, this embodiment depends on the way the palette elements are predicted or explicitly coded, as this will impact the coding. This is because the distortion gain for using the original palette element PAL with a value being very close to the corresponding predictor PRED may be too small compared to the cost of explicitly signaling PAL. As a consequence, it may be worth substituting the current palette element PAL with the corresponding predictor PRED.

In addition, in order to bias the decision towards a decision or another, it is possible to artificially decrease or increase the rate or the distortion: for instance, for a triplet of 8-bit components, the associated rate of coding the input palette PAL explicitly may be artificially set to 32 instead of 24 bits so as to force the selection of as many PRED elements as possible.

If step 1604 determines that PRED[i] and PAL[j] are not close one to each other given the distance or rate-distortion criterion, then step 1605 checks whether or not the current predictor element is the last. If it is, the algorithm goes to step 1608. Otherwise, the next predictor element is selected at step 1606, and the process loops back to step 1604.

If step 1604 determines that PRED[i] and PAL[j] are close one to each other given the distance or rate-distortion criterion, then step 1607 forces the palette element j to be equal to the predictor element currently considered, PRED[i].

In any case, the algorithm then goes to step 1608.

Steps 1608 to 1612 illustrate a step of deleting duplicated entries of the palette being built before outputting it as the current palette. Entries are "duplicate" entries when they have the same pixel values (but different indexes or levels). This is because they code the same colour.

The deleting step takes preferably place after steps 1603 to 1608. This is because these steps modify the palette elements and may thus cause additional elements to be equal. However, this step is more costly than step 1602 which makes it possible to skip all steps from 1603 to 1612.

At step 1608, the first element i in the palette PAL is selected, by set i=0.

Next, step 1609 checks whether or not the current element i in the palette, PAL[i], is before the palette element j being processed. If it is not, palette element j is unique in the palette PAL and step 1612 is thus performed to increment the SIZE of the output palette before reaching step 1613.

Otherwise, step 1610 compares current element PAL[i] to element PAL[j]. If they are equal one to the other, the algorithm continues to step 1613, thereby actually removing PAL[j] from the palette. If they are not equal, the next palette element is selected at step 1611 by incrementing i, and the process loops back to step 1609.

Step 1613 selects the next palette element to be processed by incrementing j.

Next, step 1614 checks whether or not another element of the palette remains to be considered (j=Palette_size) or the output palette is already full (SIZE=MAX). If it is the case, the output palette is fully determined and the process ends at step 1617. Otherwise, the process for the current palette element loops back to step 1602 to consider the next palette element PAL[j].

In the approach of FIG. 16, a built palette may be post-processed to substitute a palette entry with a close entry of a palette predictor PRED.

Figure 17:
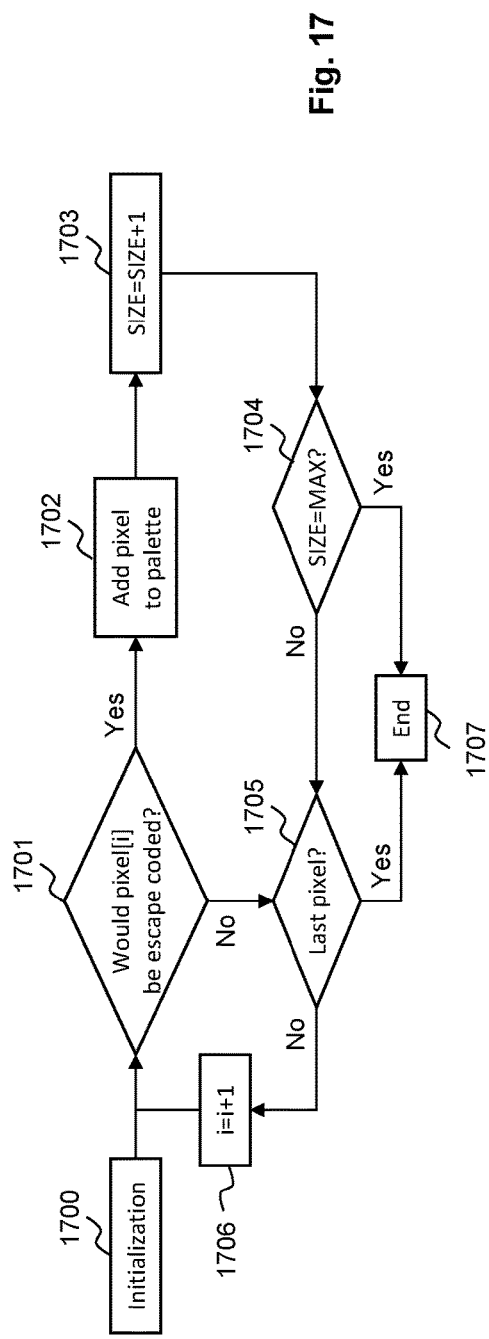
FIG. 17 illustrates other embodiments for a post-processing of a palette according to embodiments of the invention.

FIG. 17 presents another embodiment for the post-processing step 1530, but also a similar post-processing step that may occur between steps 1215 and 1216 of FIG. 12. In one embodiment, this post-processing may take place after step 1217 introduced above.

Note that the post-processing of FIG. 17 may be implemented in combination with the post-processing of FIG. 16, for example FIG. 16 before FIG. 17.

The idea of the post-processing of FIG. 17 is to counterbalance the effect of step 1217 or step 1512, which both shift the pixel value of the palette entries over time. It results that some block pixels may no longer meet the closeness criterion (with respect to the distance threshold TH—or any other threshold) to find a palette entry to encode such block pixel.

These block pixels that are improperly described by elements of the palette, meaning that no corresponding relevant levels have been found in the palette (too far from all the palette entries), are referred to as "escape-coded" pixels, since no corresponding value will be set in the block of levels.

Syntax elements has thus to be provided in the bitstream to encode such "escape-coded" pixels, including their explicit pixel values.

An example of signalling the pixels is to add an "escape" flag before the "Pred mode" element, indicating whether a pixel is palette-coded (coded using a level from a palette entry) or escape-coded (therefore with an explicit pixel value). The "escape" flag is followed by the explicit pixel value (no "Pred mode", "Level" and "Run" elements are provided for this pixel).

In a variant to the "escape" flag, a specific Level value (dedicated to "escape-coded" pixels) may be used to signal an "escape-coded" pixel. In this case, the "Run" element should be the explicit pixel value.

In any embodiment, the explicit pixel values may be coded predictively (e.g. as a difference to a neighbour pixel value) or not, using variable length coding or not, and may be quantized or not, with possible consequences for the entropy coding (contextual and number of bits, etc.).

The idea of the post-processing is to add these "escape-coded" pixels to the palette so to decrease the use of the additional syntax for the escape-coded pixels. One may note that this approach (to add a new palette entry) works in the opposite way to step 1602.

The post-processing of the palette starts at step 1700 where the variable SIZE is set to the number of elements of the input palette, and where the first block pixel to code is selected by setting i to 0.

Next, step 1701 checks whether or not the considered pixel would be palette-coded (i.e. a palette entry is close enough to the pixel) or escape-coded.

This step generally involves finding, for each palette element, its distance (L1 or L2) with the pixel considered, thereby determining the minimal distance and using it as the criterion to decide between palette or escape coding.

If the pixel considered is not escape-coded, the process goes to step 1705.

Otherwise, the pixel considered is added as a new element to the palette under construction at step 1702. Next, the palette size is incremented at step 1703, and the resulting size is compared to the maximum value allowed at step

1704. If the maximum size has been reached, the output palette has been fully determined, and the process ends at step 1707. Otherwise, the process goes to step 1705.

At step 1705, it is checked whether or not the pixel currently considered is the last one. If it is, the output palette has been fully determined, and the process ends at step 1707. Otherwise, step 1706 selects the next block pixel to be considered, and the process loops back to step 1701.

Figure 18:
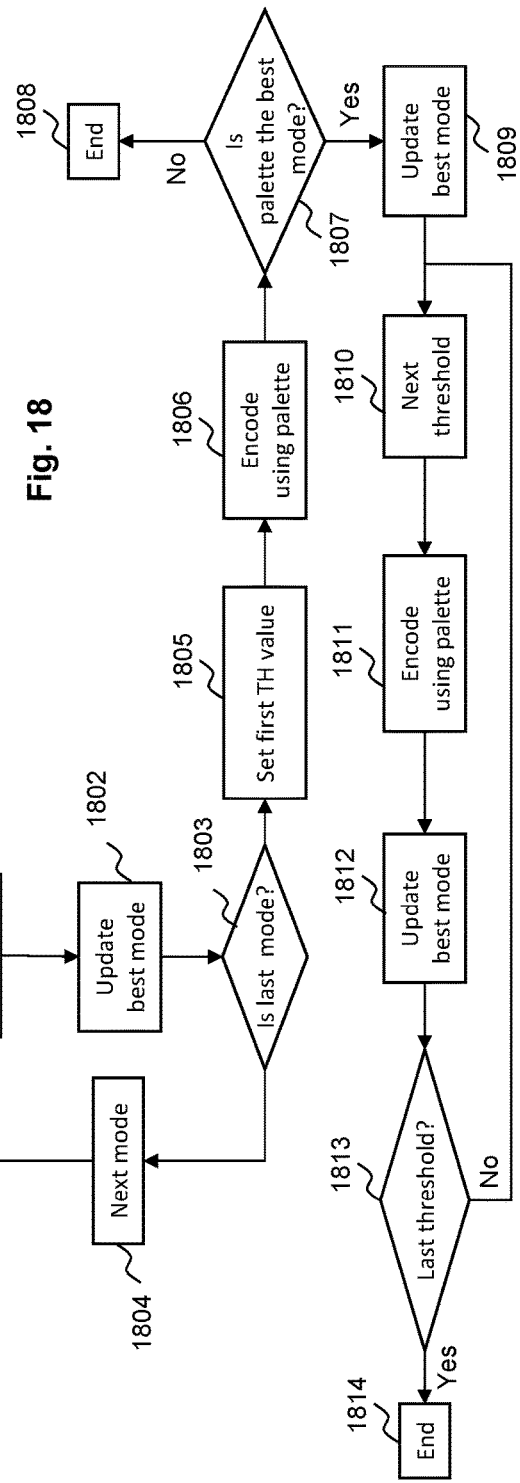
FIG. 18 illustrates a multipass algorithm involving a palette coding mode tested with different distance thresholds, according to embodiments of the invention.

FIG. 18 illustrates a multipass algorithm in which steps 1806 and 1811 of encoding using a palette may involve any palette-based embodiment described above.

Steps 1800 to 1803 are merely an embodiment of an encoder, e.g. step 106 of FIG. 1, where the best coding mode is determined from amongst a plurality of coding modes except palette coding modes (e.g. INTRA, INTER, Bidir, Skip modes), based on a rate-distortion criterion. These steps have a key role to provide a reference in coding efficiency for assessment of the palette mode as described below.

This idea of FIG. 18 is to provide a more refined way to determine the mapping between encoding parameters, such as the quantizer step, to the error limit used for the palette determination. Indeed, we have described how a default mapping may be obtained from the transform-bypass quantization formula. However, even with error limit values experimentally determined, the best value in average for a given quantizer step may be unsuited for particular image contents. By testing several other error limit values around it, a better error limit can be determined.

At step 1800, the encoder selects a first coding mode to evaluate from amongst the plurality of coding modes except palette coding modes. This can be e.g. an INTRA or INTER coding mode.

Next at step 1801, the current set of pixels (current block) is encoded using the coding mode currently selected. This encoding generates e.g. a distortion and a bitstream length.

Step 1802 then compares the current coding mode to the best coding mode as saved from previous iterations of steps 1801-1804 (the first coding mode is always considered as the best mode for the first iteration). The comparison may involve a criterion like a Lagrangian cost, derived from the aforementioned distortion and bitstream. If the coding mode currently selected is better, the process updates the best coding mode.

Next, step 1803 checks whether or not the current mode is the last coding mode (except palette mode) to be considered. If it is not the case, the next coding mode is selected at step 1804 before looping back to step 1801.

Otherwise, a reference best coding mode has been selected, and the evaluation of the palette mode may start.

A first palette coding mode is considered to evaluate whether or not alternative palette coding modes may be contemplated. This is because an idea of the multipass operation of FIG. 18 is to iteratively determine a rate-distortion criterion for a plurality of palette coding modes, the distance threshold based on which the respective palette are built being modified from one iteration to the other, and to select the palette coding mode having the distance threshold that provides the best rate-distortion criterion.

For the first palette coding mode considered, step 1805 initializes the error threshold for palette determination (i.e. for building the palette—see step 1207 or 1506). This threshold, referring to step 1501, can be a value Err[QP], contained in a table indexed by coding parameters QP, minus N, which represents the number of loops or iterations intended.

The current set of pixels is then encoded using the palette coding mode and the first threshold as set in step 1806.

Step 1807 then checks whether or not this first palette coding mode is better (in terms of rate-distortion criterion) that the best mode currently saved (as done during step 1802).

If it is not better, the encoding loops are short-circuited, and the palette encoding tests end at step 1808, keeping the best coding mode as determined at step 1802.

Otherwise, the best mode is updated at step 1809, so as to offer a new reference for the iterations on the other palette coding modes (i.e. when considering different distance thresholds for step 1207 or 1506. Consequently, the iterations for a plurality of palette coding modes are performed only if a first palette coding mode is a better coding mode than the determined best coding mode, based on the same rate-distortion criterion.

Each iteration on another palette coding mode includes
step 1810 that initiates the next iteration by modifying the threshold TH, e.g. by incrementing or decrementing it;
step 1811 that encodes the block of pixels using the palette mode with threshold TH (and thus the palette build using such distance threshold);
step 1812 that updates the best mode results depending on rate-distortion performance; and
step 1813 that checks whether or not all distance thresholds for the palette mode have been considered, e.g. by comparing the current value of threshold TH to its last expected value Err[QP]+N.

When all the distance thresholds have been considered, the process ends, and the best palette encoding (and its related threshold value) is returned. Otherwise, the encoding loops back to step 1810.

In the approach of FIG. 18, palette coding modes having different threshold values to drive the building of their respective palettes are successively tested to use the best one in terms of rate-distortion criterion.

Figure 14:
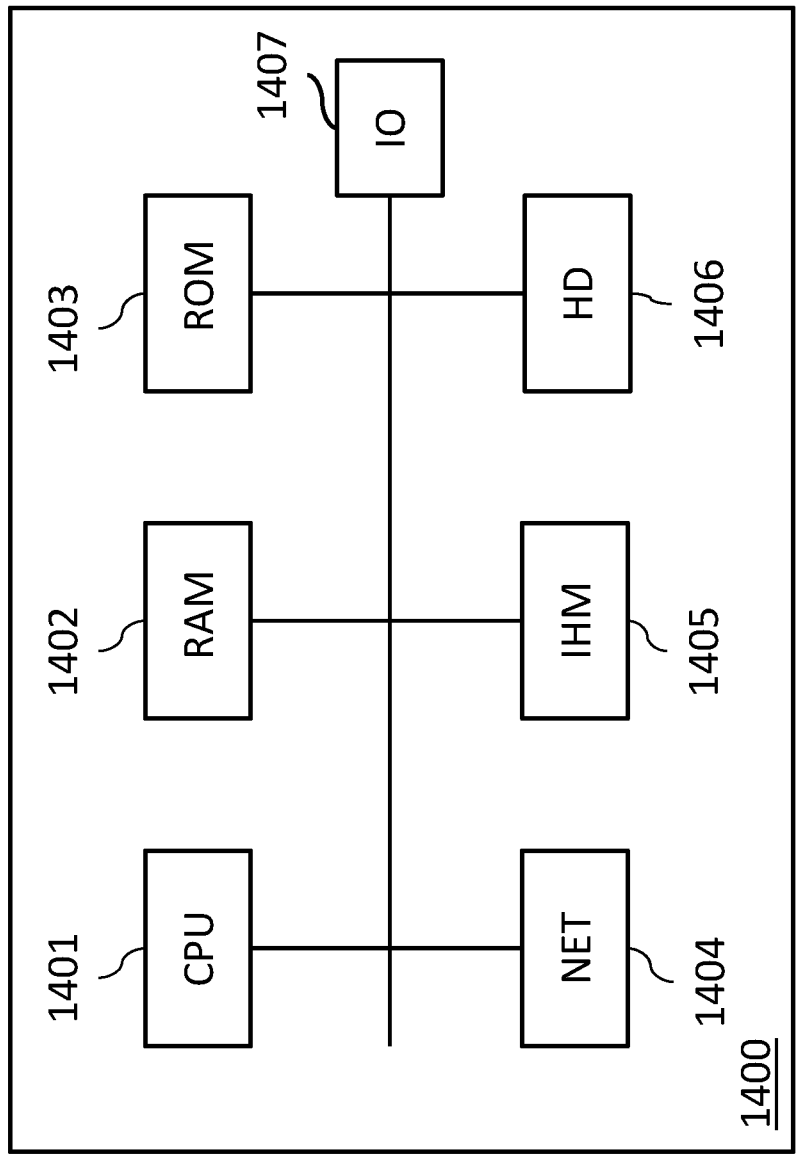
FIG. 14 is a schematic block diagram of a computing device for implementation of one or more embodiments of the invention.

FIG. 14 is a schematic block diagram of a computing device 1400 for implementation of one or more embodiments of the invention. The computing device 1400 may be a device such as a micro-computer, a workstation or a light portable device. The computing device 1400 comprises a communication bus connected to:
a central processing unit 1401, such as a microprocessor, denoted CPU;
a random access memory 1402, denoted RAM, for storing the executable code of the method of embodiments of the invention as well as the registers adapted to record variables and parameters necessary for implementing the method according to embodiments of the invention, the memory capacity thereof can be expanded by an optional RAM connected to an expansion port for example;
a read only memory 1403, denoted ROM, for storing computer programs for implementing embodiments of the invention;
a network interface 1404 is typically connected to a communication network over which digital data to be processed are transmitted or received. The network interface 1404 can be a single network interface, or composed of a set of different network interfaces (for instance wired and wireless interfaces, or different kinds of wired or wireless interfaces). Data packets are written to the network interface for transmission or are read from the network interface for reception under the control of the software application running in the CPU 1401;

a user interface 1405 may be used for receiving inputs from a user or to display information to a user;

a hard disk 1406 denoted HD may be provided as a mass storage device;

an I/O module 1407 may be used for receiving/sending data from/to external devices such as a video source or display.

The executable code may be stored either in read only memory 1403, on the hard disk 1406 or on a removable digital medium such as for example a disk. According to a variant, the executable code of the programs can be received by means of a communication network, via the network interface 1404, in order to be stored in one of the storage means of the communication device 1400, such as the hard disk 1406, before being executed.

The central processing unit 1401 is adapted to control and direct the execution of the instructions or portions of software code of the program or programs according to embodiments of the invention, which instructions are stored in one of the aforementioned storage means. After powering on, the CPU 1401 is capable of executing instructions from main RAM memory 1402 relating to a software application after those instructions have been loaded from the program ROM 1403 or the hard-disc (HD) 1406 for example. Such a software application, when executed by the CPU 1401, causes the steps of the flowcharts shown in FIGS. 15 to 18 to be performed.

Any step of the algorithms shown in FIGS. 15 to 18 may be implemented in software by execution of a set of instructions or program by a programmable computing machine, such as a PC ("Personal Computer"), a DSP ("Digital Signal Processor") or a microcontroller; or else implemented in hardware by a machine or a dedicated component, such as an FPGA ("Field-Programmable Gate Array") or an ASIC ("Application-Specific Integrated Circuit").

Although the present invention has been described hereinabove with reference to specific embodiments, the present invention is not limited to the specific embodiments, and modifications will be apparent to a skilled person in the art which lie within the scope of the present invention.

Many further modifications and variations will suggest themselves to those versed in the art upon making reference to the foregoing illustrative embodiments, which are given by way of example only and which are not intended to limit the scope of the invention, that being determined solely by the appended claims. In particular the different features from different embodiments may be interchanged, where appropriate.

In the claims, the word "comprising" does not exclude other elements or steps, and the indefinite article "a" or "an" does not exclude a plurality. The mere fact that different features are recited in mutually different dependent claims does not indicate that a combination of these features cannot be advantageously used.

The invention claimed is:

1. A method for processing a current block of pixels of an image using a current palette of a palette coding mode, the current palette comprising a set of entries associating respective entry indexes with corresponding pixel values, the method comprising the steps of:
generating an input palette from the pixels of the current block;
modifying the input palette to output the current palette;
wherein the modifying step includes substituting an entry of the input palette with an entry of a palette predictor if a predetermined criterion on the entry is met.

2. The method of claim 1, wherein the predetermined criterion is that the entry of the input palette and the entry of the palette predictor are close one to each other compared to a predefined threshold.

3. The method of claim 2, wherein the predefined threshold equals 1 when considering a distance, for instance a L1 or L2 distance, between the entry of the input palette and the entry of the palette predictor.

4. The method of claim 2, wherein the predefined threshold depends on a quantization parameter used in a quantization of the encoding.

5. The method of claim 1, wherein the predetermined criterion is a rate-distortion criterion.

6. A device for processing a current block of pixels of an image using a current palette of a palette coding mode, the current palette comprising a set of entries associating respective entry indexes with corresponding pixel values, the device comprising at least one processor configured to:
generate an input palette from the pixels of the current block;
modify the input palette to output the current palette;
wherein the modifying step includes substituting an entry of the input palette with an entry of a palette predictor if a predetermined criterion on the entry is met.

7. The device of claim 6, wherein the predetermined criterion is that the entry of the input palette and the entry of the palette predictor are close one to each other compared to a predefined threshold.

8. The device of claim 7, wherein the predefined threshold equals 1 when considering a distance, for instance a L1 or L2 distance, between the entry of the input palette and the entry of the palette predictor.

9. The device of claim 7, wherein the predefined threshold depends on a quantization parameter used in a quantization of the encoding.

10. The device of claim 6, wherein the predetermined criterion is a rate-distortion criterion.

11. A method for coding a block of pixels of a picture in a video sequence, said method comprising encoding colours of one or more pixels in the block based on a colour palette with several colour elements, each colour element being defined according to a weighted combination of several colour elements, wherein said encoding comprises:
allocating to the colour of a pixel of said block of pixels, a colour element selected among the colour elements of the colour palette, the selected colour element being the closest match to the colour of the pixel, and
updating a definition of the selected colour element of the colour palette with a value based on the colours of all the pixels in the block which have been allocated to the selected colour element.

12. The method according to claim 11, wherein the definition of the selected colour element of the colour palette is updated with a value corresponding to the average of the colours of all the pixels in the block which have been allocated to the selected colour element.

13. The method according to claim 11, wherein the definition of the selected colour element of the colour palette is updated with a value corresponding to the median of the colours of all the pixels of the block which have been allocated to the selected colour element.

14. A device for coding a block of luma and/or chroma pixels of a picture in a video sequence, said device comprising at least one processor configured to:
encode colours of one or more pixels in the block based on a colour palette with several colour elements, each colour element being defined according to a weighted combination of several colour elements, wherein said encoding of comprises:

allocating to the colour of a pixel of said block of pixels, a colour element selected among the colour elements of the colour palette, the selected colour element being the closest match to the colour of the pixel, and updating a definition of the selected colour element of the colour palette with a value based on the colours of all the pixels in the block which have been allocated to the selected colour element.

15. A non-transitory computer readable storage medium storing a program which when executed by one or more processors of a device causes the device to perform a method for processing a current block of pixels of an image using a current palette of a palette coding mode, the current palette comprising a set of entries associating respective entry indexes with corresponding pixel values, the method comprising the steps of:

generating an input palette from the pixels of the current block;

modifying the input palette to output the current palette;

wherein the modifying step includes substituting an entry of the input palette with an entry of a palette predictor if a predetermined criterion on the entry is met.

16. A non-transitory computer readable storage medium storing a program which when executed by one or more processors of a device causes the device to perform a method for coding a block of pixels of a picture in a video sequence, said method comprising encoding colours of one or more pixels in the block based on a colour palette with several colour elements, each colour element being defined according to a weighted combination of several colour elements, wherein said encoding comprises:

allocating to the colour of a pixel of said block of pixels, a colour element selected among the colour elements of the colour palette, the selected colour element being the closest match to the colour of the pixel, and updating a definition of the selected colour element of the colour palette with a value based on the colours of all the pixels in the block which have been allocated to the selected colour element.

* * * * *